(12) United States Patent
Kim et al.

(10) Patent No.: US 11,029,798 B2
(45) Date of Patent: Jun. 8, 2021

(54) DISPLAY APPARATUS AND METHOD OF CONTROLLING THE SAME

(71) Applicant: SAMSUNG ELECTRONICS CO., LTD., Suwon-si (KR)

(72) Inventors: Gwan-Hyung Kim, Suwon-si (KR); Sang Ho Kim, Hwaseong-si (KR); Hui Jun Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/634,440

(22) PCT Filed: Mar. 23, 2018

(86) PCT No.: PCT/KR2018/003423
§ 371 (c)(1),
(2) Date: Jan. 27, 2020

(87) PCT Pub. No.: WO2019/022336
PCT Pub. Date: Jan. 31, 2019

(65) Prior Publication Data
US 2020/0210002 A1    Jul. 2, 2020

(30) Foreign Application Priority Data
Jul. 27, 2017  (KR) .................. 10-2017-0095247

(51) Int. Cl.
*G06F 3/046*    (2006.01)
(52) U.S. Cl.
CPC .................. *G06F 3/046* (2013.01)

(58) Field of Classification Search
CPC .. G06F 3/03; G06F 3/041; G06F 2203/04101; G06F 3/0416; G06F 3/042;
(Continued)

(56) References Cited

U.S. PATENT DOCUMENTS

2010/0321315 A1* 12/2010 Oda .................. G06F 3/046
345/173
2016/0274714 A1  9/2016 Chen et al.
2018/0246612 A1*  8/2018 Lynn ................ G06F 3/0414

FOREIGN PATENT DOCUMENTS

JP   2016-001535   1/2016
KR  10-2013-0045222  5/2013
(Continued)

OTHER PUBLICATIONS

International Search Report for PCT/KR2018/003423, dated Jul. 13, 2018, 6 pages.
(Continued)

*Primary Examiner* — Nelson M Rosario
(74) *Attorney, Agent, or Firm* — Nixon & Vanderhye, P.C.

(57) ABSTRACT

An example display apparatus includes a first signal transceiver; a second signal transceiver installed at a position different from the first signal transceiver; a processor configured to determine a position in a two-dimensional space or a three-dimensional space of at least one detection object using the first signal transceiver and the second signal transceiver, and to generate a control signal corresponding to the position of the at least one detection object; and a display configured to operate according to the control signal.

13 Claims, 31 Drawing Sheets

(58) Field of Classification Search
CPC ........ G06F 3/046; G06F 3/0412; G01S 13/10; G01S 13/87; G01S 13/88; H03K 17/9636; H03K 2217/94042
See application file for complete search history.

(56) References Cited

FOREIGN PATENT DOCUMENTS

| | | |
|---|---|---|
| KR | 10-2014-0042244 | 4/2014 |
| KR | 10-2016-0130104 | 11/2016 |

OTHER PUBLICATIONS

Written Opinion of the ISA for PCT/KR2018/003423, dated Jul. 13, 2018, 5 pages.

* cited by examiner

DISPLAY APPARATUS AND METHOD OF CONTROLLING THE SAME

This application is the U.S. national phase of International Application No. PCT/KR2018/003423 filed 23 Mar. 2018, which designated the U.S. and claims priority to KR Patent Application No. 10-2017-0095247 filed 27 Jul. 2017, the entire contents of each of which are hereby incorporated by reference.

BACKGROUND

1. Field

The present disclosure relates to a display apparatus and a method of controlling the display apparatus.

2. Description of Related Art

A touch screen refers to a device that detects a position where touch such as by a finger or a stylus pen is contacted on a plane of a display, and receives a user command based on a detection result. The touch screens are widely used in various devices due to the convenience of their operation. For example, the touch screen is applied to various types of devices such as smartphones, tablet personal computers (PCs), monitor devices, laptop computers, kiosks, point of sales (POS) terminals, navigation devices, and the like.

Conventional touch screens are implemented by placing an infrared light emitting diode at an edge of the display (infrared), using a sensor that detects pressure applied on the touch screen (decompression), or using a sensor that detects a change in an electrical signal generated when an object comes in contact with the touch screen (electrostatic method).

SUMMARY

The present disclosure is directed to providing a display apparatus capable of more accurately determining a position of a detection object and appropriately receiving a user input, when an input is performed using the detection object, and a method of controlling the same.

In order to solve the above problems, a display apparatus and a method of controlling the display apparatus are provided.

One aspect of the present disclosure provides a display apparatus including: a first signal transceiver; a second signal transceiver installed at a position different from the first signal transceiver; a processor configured to determine a position in a two-dimensional space or a three-dimensional space of at least one detection object using the first signal transceiver and the second signal transceiver, and to generate a control signal corresponding to the position of the at least one detection object; and a display configured to operate according to the control signal. The processor may be configured to control at least one of the first signal transceiver and the second signal transceiver to radiate a first electromagnetic wave of a first frequency, when the at least one of the first signal transceiver and the second signal transceiver receives a first reflected wave reflected from the at least one detection object, to control the first signal transceiver to radiate a second electromagnetic wave of a second frequency higher than the first frequency, and to control the second signal transceiver to radiate a third electromagnetic wave of a third frequency higher than the first frequency, and to determine the position of the at least one detection object based on a second reflected wave corresponding to the second electromagnetic wave and a third reflected wave corresponding to the third electromagnetic wave.

The processor may be configured to control the first signal transceiver to transmit a fourth electromagnetic wave of a fourth frequency that is higher than the first frequency and lower than the second frequency, and the first signal transceiver is configured to receive a fourth reflected wave corresponding to the fourth electromagnetic wave.

The processor may be configured to control the second signal transceiver to transmit a fifth electromagnetic wave of a fifth frequency that is higher than the first frequency and lower than the third frequency, and the second signal transceiver is configured to receive a fifth reflected wave corresponding to the fifth electromagnetic wave.

The processor may be configured to determine whether a plurality of the detection objects exist based on the fourth reflected wave or the fifth reflected wave.

When it is determined that the plurality of detection objects exist, the processor may be configured to control the first signal transceiver and the second signal transceiver to transmit the second electromagnetic wave and the third electromagnetic wave, respectively.

The display apparatus may further include a third signal transceiver disposed at a position different from the first signal transceiver and the second signal transceiver, configured to radiate a sixth electromagnetic wave. In this case, when it is determined that the plurality of detection objects exist, the processor may be configured to control the first signal transceiver, the second signal transceiver, and the third signal transceiver to transmit the second electromagnetic wave, the third electromagnetic wave, and the sixth electromagnetic wave, respectively.

The processor may be configured to determine a position of any one of the plurality of detection objects based on at least one of the first signal transceiver, the second signal transceiver, and the third signal transceiver.

The processor may be configured to control the first signal transceiver to radiate the first electromagnetic wave periodically or continuously.

The display may further include a fourth signal transceiver configured to radiate an eighth electromagnetic wave in an inclined direction with respect to one surface on which a screen of the display is displayed, and to receive an eighth reflected wave correspond to the eighth electromagnetic wave and reflected by the at least one detection object.

The processor may be configured to determine a position of the at least one detection object based on the second reflected wave, the third reflected wave, and the eighth reflected wave.

The processor may be configured to determine distances between the at least one detection object and the first signal transceiver, the second signal transceiver, and the fourth signal transceiver based on the second reflected wave, the third reflected wave, and the eighth reflected wave, and to determine the distance between the at least one detection object and the one surface using the determined distances.

Another aspect of the present disclosure provides a method of controlling a display apparatus including: transmitting, by a first signal transceiver, a first electromagnetic wave of a first frequency; receiving, by the first signal transceiver, a first reflected wave corresponding to the first electromagnetic wave and reflected by a detection object; transmitting, by the first signal transceiver, a second electromagnetic wave of a second frequency higher than the first frequency, and receiving a second reflected wave corresponding to the second electromagnetic wave; transmitting, by a second signal transceiver, a third electromagnetic wave of a third frequency higher than the first frequency, and receiving a third reflected wave corresponding to the third electromagnetic wave; and determining, by a processor, a position of the detection object based on the second reflected wave and the third reflected wave.

The method may further include transmitting, by the first signal transceiver, a fourth electromagnetic wave of a fourth frequency that is higher than the first frequency and lower than the second frequency, and receiving a fourth reflected wave corresponding to the fourth electromagnetic wave; and transmitting, by the second signal transceiver, a fifth electromagnetic wave of a fifth frequency that is higher than the first frequency and lower than the third frequency, and receiving a fifth reflected wave corresponding to the fifth electromagnetic wave.

The method may further include determining, by the processor, whether a plurality of the detection objects exist based on the fourth reflected wave or the fifth reflected wave.

The method may further include, when it is determined that the plurality of detection objects exist, transmitting, by the first signal transceiver and the second signal transceiver, the second electromagnetic wave and the third electromagnetic wave, respectively.

The method may further include, when it is determined that the plurality of detection objects exist, transmitting, by the first signal transceiver, the second signal transceiver, and the third signal transceiver, the second electromagnetic wave, the third electromagnetic wave, and a sixth electromagnetic wave, respectively, wherein the third signal transceiver is installed at a position different from the first signal transceiver and the second signal transceiver.

The determining of a position of the detection object based on the second reflected wave and the third reflected wave may include determining, by the processor, a position of any one of the plurality of detection objects based on at least one of the first signal transceiver, the second signal transceiver, and the third signal transceiver.

The method may further include radiating, by a fourth signal transceiver, an eighth electromagnetic wave, and receiving an eighth reflected wave correspond to the eighth electromagnetic wave and reflected from at least one detection object. The fourth signal transceiver may be configured to radiate electromagnetic waves in an inclined direction with respect to one surface on which a screen of a display is displayed.

The method may further include determining, by the processor, a position of the at least one detection object based on the second reflected wave, the third reflected wave, and the eighth reflected wave.

The determining of the position of the at least one detection object based on the second reflected wave, the third reflected wave, and the eighth reflected wave may further include determining a distance between the at least one detection object and the one surface based on the second reflected wave, the third reflected wave, and the eighth reflected wave.

Another aspect of the present disclosure provides a display apparatus including: a display; a plurality of signal transceivers installed at different positions around the display, configured to radiate electromagnetic waves, and to receive reflected waves reflected by a detection object in contact with or close to one surface of the display; and a processor configured to calculate distances between the detection object and the plurality of signal transceivers using the reflected waves received by the plurality of signal transceivers, to determine a position of at least one detection object based on the calculated distances, and to control the display based on the position of the at least one detection object.

According to the above-described display apparatus and the method of controlling the display apparatus, by properly determining the position of the detection object, it is possible to more accurately determine an input position in two-dimensions (2D) or an input position in three-dimensions (3D).

In addition, according to the above-described display apparatus and the method of controlling the display apparatus, it is possible to improve a problem of coordinate recognition error due to foreign substance contamination or the like, such as deterioration of display quality or deterioration of luminance.

Further, according to the above-described display apparatus and the method of controlling the display apparatus, it is possible to reduce the manufacturing cost and production cost of the display apparatus capable of touch detection.

DETAILED DESCRIPTION OF EXAMPLE EMBODIMENTS

Like numbers refer to like elements throughout this specification. This specification does not describe all components of the embodiments, and general information in the technical field to which the present disclosure belongs or overlapping information between the embodiments will not be described. The terms "portion," "module," "element," and "block," as used herein, may be implemented as software or hardware, and according to embodiments, a plurality of "portions," "modules," "elements," and "blocks" may be implemented as a single component, or a single "portion," "module," "element," and "block" may include a plurality of components.

It will be understood that when a component is referred to as being "connected" to another component, it can be directly or indirectly connected to the other component. When a component is indirectly connected to another component, it may be connected to the other component through a wireless communication network.

Also, it will be understood that the terms "includes," "comprises," "including," and/or "comprising," when used in this specification, specify the presence of a stated component, but do not preclude the presence or addition of one or more other components.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

A detection object positioning apparatus according to embodiments of the present disclosure will hereinafter be described with reference to FIGS. 1 to 19.

Figure 1:
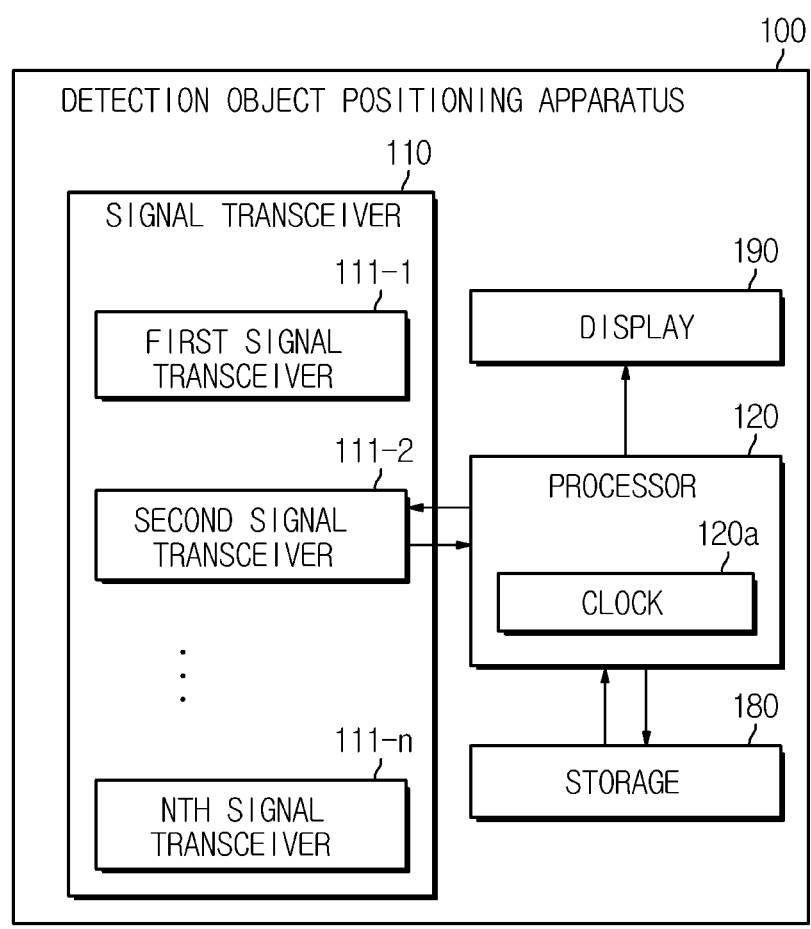
FIG. 1 is a block diagram illustrating an embodiment of a detection object positioning apparatus.

FIG. 1 is a block diagram illustrating an embodiment of a detection object positioning apparatus.

Referring to FIG. 1, a detection object positioning apparatus 100 may include a signal transceiver 110 and a processor 120, and may further include a storage 180 as necessary.

The detection object positioning apparatus 100 refers to a device that may determine a position of a detection object 10 (see FIG. 3) and receive a predetermined command from a user according to the determined position. In this case, the detection object positioning apparatus 100 may receive a command corresponding to a point or a zone where the detection object 10 is located.

For example, the detection object 10 may be located in contact with or in proximity to one plane of the detection object positioning apparatus 100, for example, a point in front of a display 190, or may be located close to a point on a space where the detection object 10 is spaced apart from one plane by a predetermined distance. The detection object positioning apparatus 100 may receive a command (for example, a command for selecting a specific point) corresponding to the point on one plane or the point on the space where the detection object 10 is contacted based on the position of the detection object 10. Hereinafter, when the detection object 10 contacts or approaches one point of one plane and a command is input, it is referred to as a two-dimensional (2D) touch operation. When the detection object 10 is located at the point in the space spaced apart from the one plane by the predetermined distance and a command is input, it is referred to as a three-dimensional (3D) touch operation.

The detection object positioning apparatus 100 may include a predetermined device that can be designed to receive the command according to the 2D touch operation or the 3D touch operation. For example, the detection object positioning apparatus 100 may be a display apparatus. Here, the display apparatus may include, for example, electronic blackboards, digital televisions, monitor devices, smartphones, tablet personal computers (PCs), navigation devices, electronic billboards, or various types of devices capable of displaying other images. In addition, the detection object positioning apparatus 100 may be implemented as various types of devices capable of inputting commands according to contact or proximity, such as exterior walls or walls of various types of devices or buildings, billboards, windows, windshields, and the like.

The detection object 10 may be implemented using various objects on which the detection object positioning apparatus 100 may detect the position. For example, the detection object 10 may include a part of a body, such as a human finger or hand, or may include a writing instrument such as a ballpoint pen, a pencil, or a stylus pen. In addition to these, various objects employable for inputting the command to the detection object positioning apparatus 100, such as an indicator bar, can be used as the detection object 10.

The signal transceiver 110 may transmit or receive a signal for measuring the position of the detection object 10. The signal transceiver 110 may be provided to output and radiate a predetermined wave and to receive a wave (hereinafter referred to as a "reflected wave") reflected by the detection object 10. Here, the wave may include an electromagnetic wave, where the electromagnetic wave may include at least one of X-rays, infrared rays, ultraviolet rays, radio waves, and microwaves. In addition, the wave may include sound waves or ultrasonic waves, according to the embodiment.

According to an embodiment, the detection object positioning apparatus 100 may include a plurality of the signal transceivers 110 (110-1, 110-2, . . . 110-N).

The plurality of signal transceivers 110 (110-1, 110-2, . . . 110-N) may be provided to radiate the predetermined wave to the outside independently or dependently from each other at different positions, and to output an electrical signal corresponding to the received reflected wave.

Each of the plurality of signal transceivers 110 (110-1, 110-2, . . . 110-N) may start an operation according to a control signal transmitted from the processor 120 to radiate the predetermined wave to the outside, and may transmit the electrical signal corresponding to the reflected wave to the processor 120 through a circuit, a conductive wire, or the like.

Figure 2A:
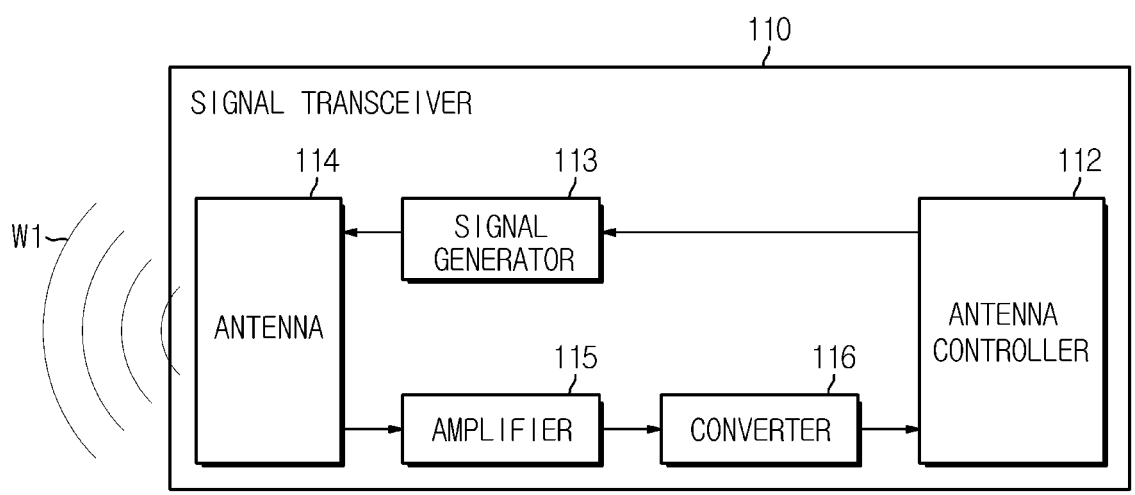
FIG. 2A is a block diagram illustrating an embodiment of a signal transceiver.

FIG. 2A is a block diagram illustrating an embodiment of a signal transceiver.

Referring to FIG. 2A, at least one of the signal transceivers, for example, a first signal transceiver 111-1, may include an antenna controller 112, a signal generator 113, an antenna 114, an amplifier 115, and a converter 116. At least two of them may be provided so as to transmit electrical signals to each other through circuits or conductors. Some of them may be omitted depending on the embodiments.

The antenna controller 112 may transmit a control signal related to signal generation to the signal generator 113 according to the control of the processor 120 or according to a predefined setting or a user input. In addition, the antenna controller 112 may perform various arithmetic processing, transmit data to the processor 120, or transmit the data to the storage 180 based on an electrical signal corresponding to the wave received by the antenna 114. Here, the arithmetic processing may include a positioning process of the detection object 10, according to the embodiments.

The signal generator 113 may generate and output an electrical signal having a predetermined frequency (or predetermined wavelength) according to the control signal received from the processor 120 or the antenna controller 112.

The antenna 114 may receive a signal generated by the signal generator 113, convert the received signal into a wave w, and output the wave w corresponding to the electrical signal generated by the signal generator 113, for example, electromagnetic waves W or ultrasonic waves, and radiate the generated wave to the outside. When the electrical signal of the predetermined frequency is transmitted from the signal generator 113, the antenna 114 may generate the wave W having a frequency corresponding to the predetermined frequency and radiate it to the outside.

In addition, the antenna 114 may receive waves transmitted from the outside, for example, electromagnetic waves or ultrasonic waves, and may output electrical signals corresponding to the received electromagnetic waves or ultrasonic waves. Here, the output electrical signal may be an analog signal.

According to the embodiments, a portion radiating the wave W of the antenna 114, and a portion for receiving the wave transmitted from the outside to output the electrical signal may be integrally implemented, or may be implemented separately, respectively.

The antenna 114 may be implemented using a directional antenna such that the radiated electromagnetic wave W can be transmitted along one plane generally over one plane. In this case, the antenna 114 may have a directivity such that the electromagnetic wave W radiated by the antenna 114 may pass through all or most of one plane.

The electrical signal corresponding to the wave received by the antenna 114 may, for example, be transmitted to the amplifier 115 to the converter 116, or directly to the antenna controller 112.

The amplifier 115 may amplify and transmit the electrical signal output from the antenna 114 to the converter 116 or the antenna controller 112.

The converter 116 may convert the analog signal output from the antenna 114 or amplified by the amplifier 115 into a digital signal, and may transmit the converted signal to the antenna controller 112.

The antenna controller 112, the signal generator 113, the amplifier 115, and the converter 116 may be implemented using any circuit and/or semiconductor chip commonly used. In addition, the antenna 114 may also be implemented by employing any one of a variety of commonly used antennas.

Other signal transceivers 111-2, . . . , and 111-N other than the first signal transceiver 111-1 may also be provided in the same or partially modified form as described above, and may include, for example, the antenna controller 112, the signal generator 113, the antenna 114, the amplifier 115, and the converter 116.

The processor 120 may be provided to perform various arithmetic processing required for the operation of the detection object positioning apparatus 100 or to control the overall operation of the detection object positioning apparatus 100.

The processor 120 may drive an application (also called a program or an app) to perform a predetermined arithmetic, processing and control operation, or may perform the predetermined arithmetic, processing and control operation according to a preset application.

The processor 120 may include, for example, a Central Processing Unit (CPU), a Microcontroller Unit (MCU), a Microprocessor (MICOM), an Application Processor (AP), an Electronic Control Unit (ECU) and/or various kinds of processing units that can perform various calculations and generate control signals. The above-mentioned devices may be implemented using, for example, one or more semiconductor chips and associated elements.

The processor 120 may generate a control signal for start of the operation of the signal transceiver 110 and transmit the generated control signal to the signal transceiver 110. When the plurality of signal transceivers 110 (110-1, 110-2, . . . , 110-N) are provided, the processor 120 may generate the control signal for all or part of the plurality of signal transceivers 110 (110-1, 110-2, . . . , 110-N) and transmit it to each of the corresponding signal transceivers 110 (110-1, 110-2, . . . , 110-N). Accordingly, all or some of the plurality of signal transceivers 110 (110-1, 110-2, . . . , 110-N) radiate waves, for example, the electromagnetic waves.

In addition, the processor 120 may receive information corresponding to the reflected wave reflected and transmitted by the detection object 10 from the signal transceiver 110, and calculate the position of the detection object 10 based on the received information. When the plurality of signal transceivers 110 (110-1, 110-2, . . . , 110-N) are provided, the processor 120 may calculate and obtain the position of the detection object 10 based on the electrical signal transmitted from at least one of the plurality of signal transceivers 110 (110-1, 110-2, . . . , 110-N). A detailed description of the process of determining the position of the detection object 10 by the processor 120 will be described later.

The processor 120 may further include a clock 120a that counts the passage of time to obtain a distance from the detection object 10.

The storage 180 may store various types of information necessary for the operation of the detection object positioning apparatus 100 or the arithmetic, processing, or control operation of the processor 120 in an electronic form. For example, the storage 180 may store the application or data related to the operation of the storage 180 and provide all or a portion of the stored application or data to the processor 120 according to a call of the processor 120. Here, the application stored in the storage 180 may be obtained through an electronic software distribution network.

The storage 180 may be implemented using a magnetic disk storage medium (for example, a hard disk and a floppy disk), a magnetic tape, an optical medium (for example, a Compact Disk (CD) and a Digital Versatile Disk (DVD)), a magneto-optical medium (for example, a floptical disk), or a semiconductor storage device (for example, Read Only Memory (ROM), Random Access Memory (RAM), SD card, flash memory, and Solid State Drive (SSD)).

In addition, the storage 180 may include a buffer memory. The buffer memory may temporarily or non-temporarily store the electrical signal output from the signal transceiver 110 corresponding to the reflected wave in the form of data, and then transmit the stored data to the processor 120. The processor 120 may calculate the position of the detection object 10 based on the data transmitted from the buffer memory.

When the detection object positioning apparatus 100 is implemented using the display apparatus, the detection object positioning apparatus 100 may further include the display 190. The display 190 may be implemented using at least one display panel. The display panel may be implemented using, for example, a plasma display panel (PDP), a light-emitting diode (LED) display panel and/or a liquid crystal display (LCD). The LED panel may include an organic light-emitting diode (OLED), and the OLED may be a passive matrix organic light-emitting diode (PMOLED) or an active matrix organic light-emitting diode (AMOLED). Of course, according to the embodiments, the display 190 may include a cathode ray tube (CRT). In addition to the above-described example, the display 190 may include at least one of various devices capable of displaying a screen.

Hereinafter, an example in which the signal transceiver 110 is disposed will be described when the detection object positioning apparatus 100 is the display apparatus and the two signal transceivers 111-1 and 111-2 are installed.

Figure 2B:
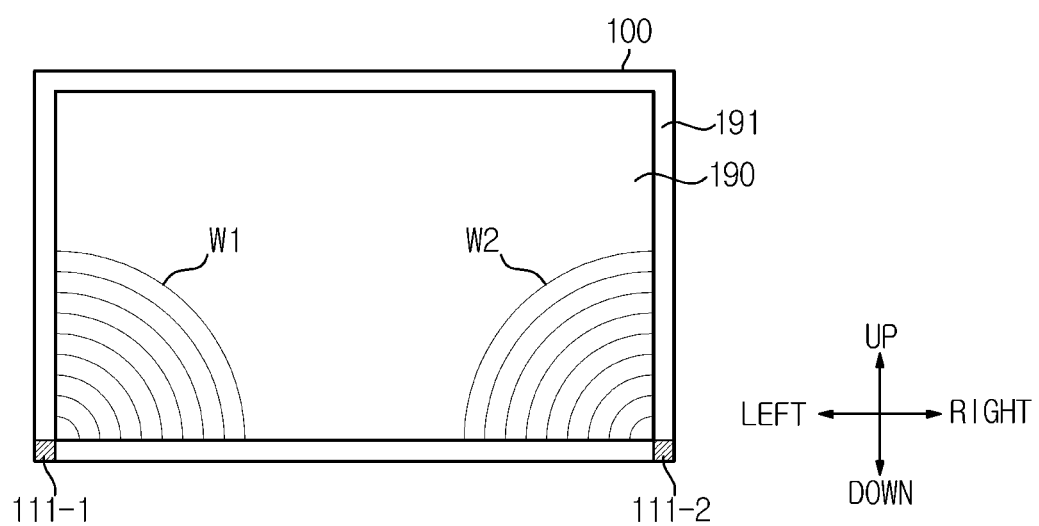
FIG. 2B is a front view illustrating an embodiment of a detection object positioning apparatus.

FIG. 2A is a block diagram illustrating an embodiment of a signal transceiver, and FIG. 2B is a front view illustrating an embodiment of a detection object positioning apparatus. For convenience of explanation, the direction in which the display 190 outputs the screen is referred to as a front direction, the direction opposite to the front direction is referred to as a rear direction and the four directions orthogonal to the front direction or the rear direction are referred to as up, down, left, and right directions. However, the directions may be arbitrarily defined by a designer.

Figure 2C:
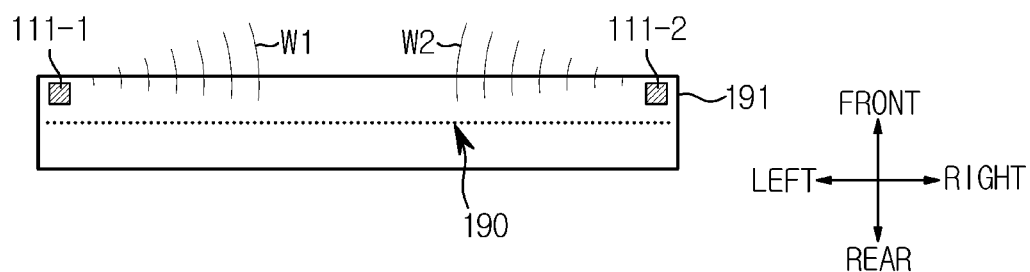
FIG. 2C is a bottom view illustrating an embodiment of a detection object positioning apparatus.

As illustrated in FIGS. 2B and 2C, the detection object positioning apparatus 100, which is the display apparatus, may include the display 190. The signal transceiver 110, that is, the first signal transceiver 111-1 and the second signal transceiver 111-2 may be installed at or near the boundary of the display 190.

For example, the first signal transceiver 111-1 may be installed at or near the bottom of the left end of the display 190, and may be provided to radiate an electromagnetic wave W1 toward the display 190. In addition, the second signal transceiver 111-2 may be installed at or near the bottom of the right end of the display 190 as opposed to the position where the first signal transceiver 111-1 is installed, and may be provided to radiate an electromagnetic wave W2 toward the display 190. The installation positions of each of the first signal transceiver 111-1 and the second signal transceiver 111-2 described above are exemplary, and the first signal transceiver 111-1 and the second signal transceiver 111-2 may be installed at various positions according to the designer's selection. For example, the first signal transceiver 111-1 and the second signal transceiver 111-2 may be installed at the top of the left end and the top of the right end of the display 190, respectively. In addition, at least one of the first signal transceiver 111-1 and the second signal transceiver 111-2 may be installed at the top or bottom of the periphery or the center of the display 190.

In the embodiments, at least one of the first signal transceiver 111-1 and the second signal transceiver 111-2 may be installed to overlap a part of the display 190, or may be installed not to overlap.

At least one of the first signal transceiver 111-1 and the second signal transceiver 111-2 may be installed in the front direction with respect to the display 190, as illustrated in FIG. 2C.

In addition, the detection object positioning apparatus 100 may include an exterior housing 191 for fixing the display 190 and embedding various components therein. At least one of the first signal transceiver 111-1 and the second signal transceiver 111-2 may be installed in the exterior housing 191 and installed around the display 190. In this case, at least one of the first signal transceiver 111-1 and the second signal transceiver 111-2 may be mounted and installed in a groove formed in the exterior housing 191, or may be installed by being exposed to the outer surface of the exterior housing 191. The groove may be provided to face the display 190 or the front.

The first signal transceiver 111-1 and the second signal transceiver 111-2 may be installed to allow the radiated electromagnetic waves W1 and W2 to travel along the outer surface of the display 190, as illustrated in FIG. 2C. The directivity of the electromagnetic waves W1 and W2 may be realized by employing the directional antenna 114 installed in the periphery of the first signal transceiver 111-1 and/or the second signal transceiver 111-2. It may be realized by using a guide member for guiding the traveling direction of the electromagnetic waves W1 and W2 radiated from the first signal transceiver 111-1 and the second signal transceiver 111-2.

Figure 3:
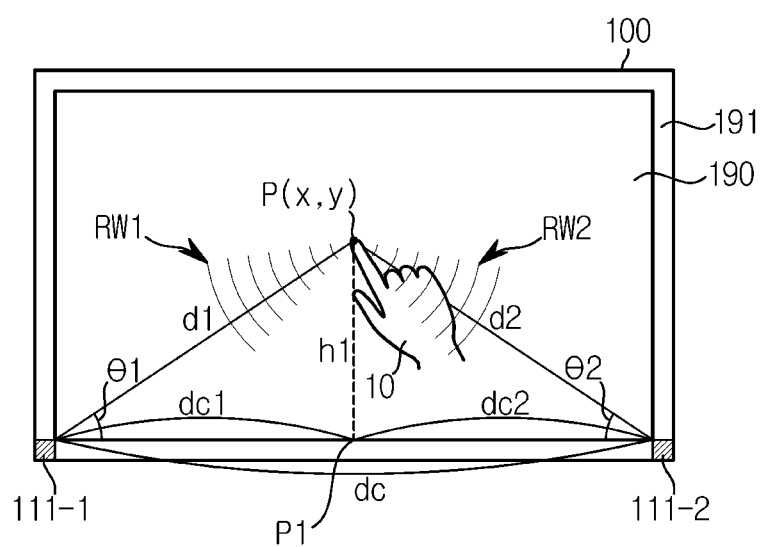
FIG. 3 is a view illustrating an example of detecting a touch operation and a touch operation position of a detection object.

FIG. 3 is a view illustrating an example of detecting a touch operation and a touch operation position of a detection object.

The processor 120 may generate the control signal for the start of operations of the first signal transceiver 111-1 and the second signal transceiver 111-2, and transmit the generated control signal to the first signal transceiver 111-1 and the second signal transceiver 111-2. In this case, the processor 120 may separately obtain information (hereinafter referred to as a "radiation time point") about a time point at which the control is generated using the clock 120a, a time point at which the control signal is transmitted, or a time point at which the first signal transceiver 111-1 and the second signal transceiver 111-2 are expected to radiate the electromagnetic waves W1 and W2, and may record them in the storage 180.

The first signal transceiver 111-1 and the second signal transceiver 111-2 may radiate the electromagnetic waves W1 and W2 in response to receiving the control signal for the start of operations transmitted from the processor 120.

As illustrated in FIG. 3, when the detection object 10, such as a fingertip, is present in contact with or in close proximity to the front of the display 190, the electromagnetic waves W1 and W2 may be reflected by the detection object 10. Accordingly, reflected waves RW1 and RW2 may be transmitted in the directions of the first signal transceiver 111-1 and the second signal transceiver 111-2. Accordingly, the first signal transceiver 111-1 and the second signal transceiver 111-2 may receive the reflected waves RW1 and RW2. The first signal transceiver 111-1 and the second signal transceiver 111-2 may output the electrical signals corresponding to the received reflected waves RW1 and RW2, respectively, and the output electrical signals may be transmitted through the storage 180 or directly to the processor 120.

The processor 120 may obtain information (hereinafter referred to as a "reception time point") about a time point at which the electrical signals corresponding to the reflected waves RW1 and RW2 is received, and a time point at which at least one of the first signal transceiver 111-1 and the second signal transceiver 111-2 is expected to receive the reflected waves RW1 and RW2.

In this case, the velocity of the electromagnetic waves W1 and W2 and the reflected waves RW1 and RW2 is constant since a medium is substantially the same. Accordingly, the processor 120 may calculate and obtain distances 2*d1 and 2*d2 until the radiated electromagnetic waves W1 and W2 are reflected by the detection object 10 and returned using the difference between the radiation time point and the reception time point, and may obtain a distance d1 between the detection object 10 and the first signal transceiver 111-1 and a distance d2 between the detection object 10 and the second signal transceiver 111-2.

Since a distance dc of the first signal transceiver 111-1 and the second signal transceiver 111-2 is a known value, applying each of the obtained distances d1, d2, and d3 to the Heron's formula, a distance h1 between the detection object 10 and the bottom boundary of the display 190 may be calculated. When the detection object 10 expresses a point of contact or proximity in a 2D coordinate P (x, y), the distance h1 between the detection object 10 and the bottom boundary of the display 190 may be used as a y value of the coordinate P (x, y) for the point where the detection object 10 is in contact with or in proximity to the point.

When the distance h1 between the detection object 10 and the bottom boundary of the display 190 is calculated, a distance dc1 between the first signal transceiver 111-1 and a point P1 at the bottom boundary of the display 190 (the point at which a straight line passing through the detection object 10 is orthogonal to the bottom boundary of the display 190) may be calculated. If a point of reference (i.e., an origin) of the coordinate is the point where the first signal transceiver 111-1 is located at or close to the point where the first signal transceiver 111-1 is located, the first signal transceiver 111-1 and the point P1 of the bottom boundary of the display 190 may be used as an x value of the coordinate P (x, y) for the point where the detection object 10 is in contact with or in proximity to the point.

Alternatively, the distance between the second signal transceiver 111-2 and the point P1 of the bottom boundary of the display 190 may also be calculated using a Pythagorean theorem or a trigonometric function. If the origin is at or close to the point where the second signal transceiver 111-2 is located, a distance dc2 between the second signal transceiver 111-2 and the point P1 of the bottom boundary of the display 190 may be used as the x value of the coordinate P (x, y) for the point where the detection object 10 is in contact with or in proximity to the point.

As such, the coordinate P (x, y) of the point where the detection object 10 is located may be calculated, and thus the position of the detection object 10 may be determined.

When the position of the detection object 10 is determined, the processor 120 may perform an operation corresponding to the position of the detection object 10, for example, an execution operation of the application corresponding to an icon displayed at the position where the detection object 10 is in contact with.

Hereinafter, the embodiments of the operation of the processor in the case where the first signal transceiver 111-1 and the second signal transceiver 111-2 are provided will be described with reference to FIGS. 4 to 10.

Figure 4:
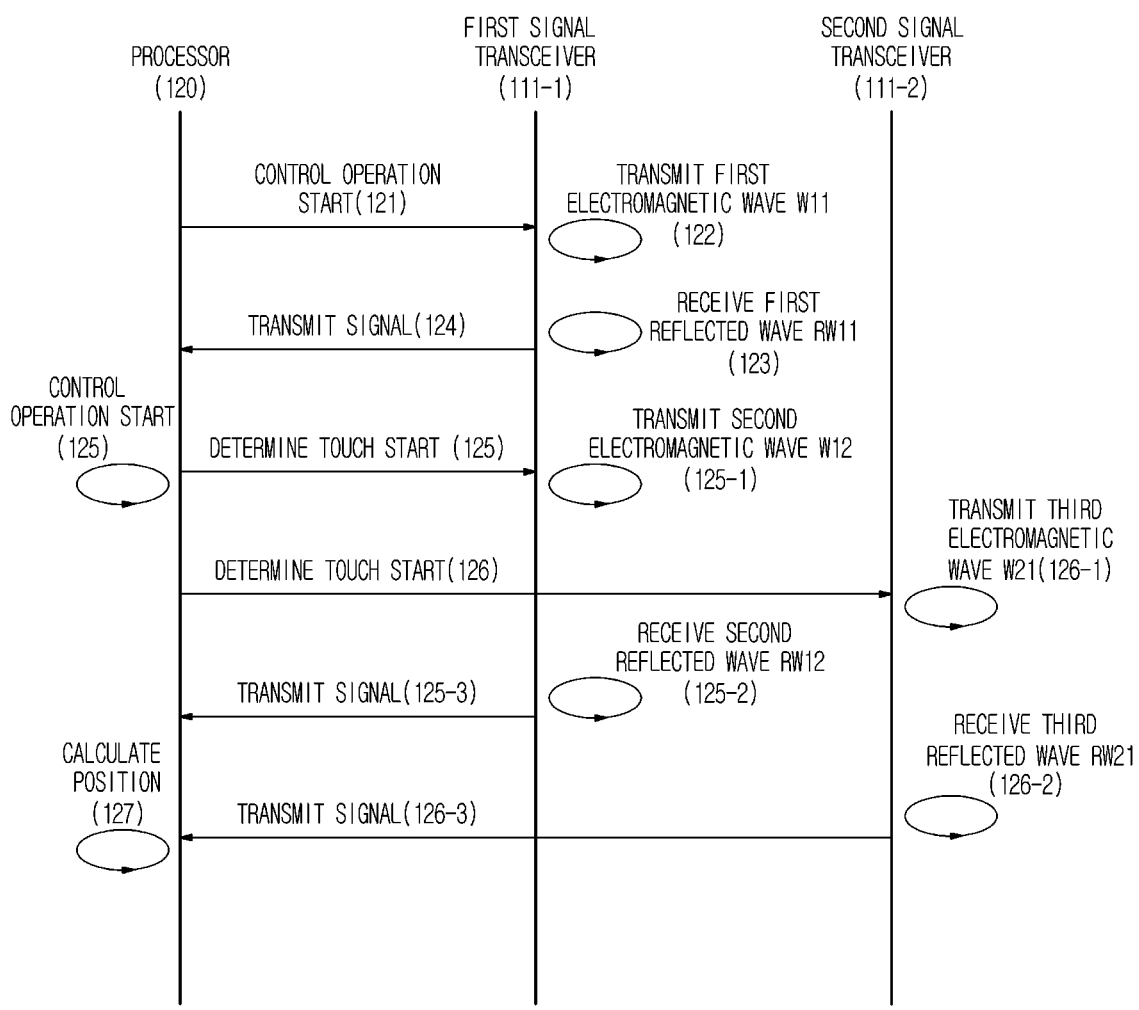
FIG. 4 is a view illustrating a first embodiment of an operation of a processor.
Figure 5:
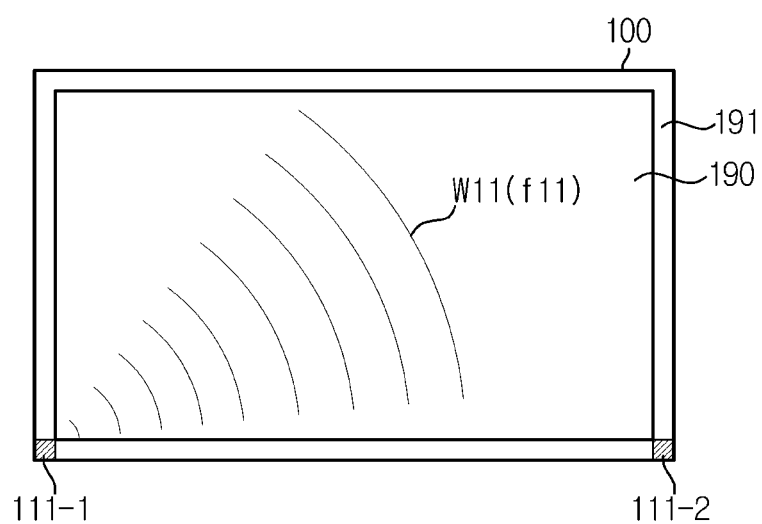
FIG. 5 is a view illustrating an example in which a first signal transceiver transmits a first electromagnetic wave.
Figure 6:
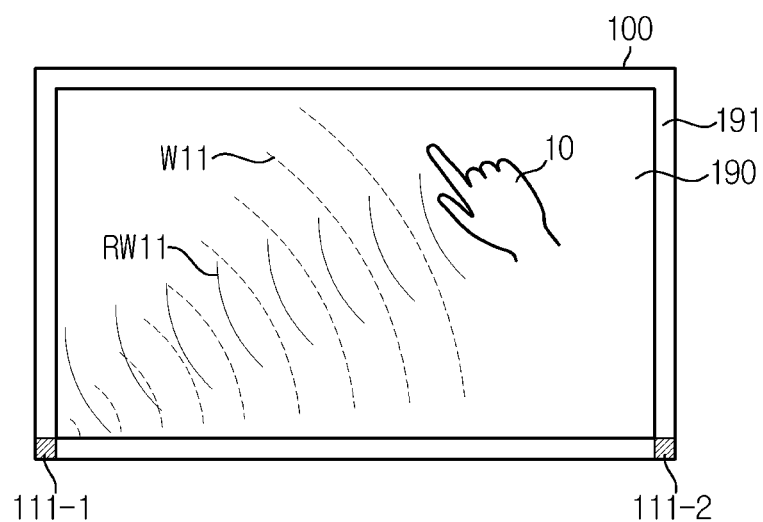
FIG. 6 is a view illustrating an example in which a first signal transceiver receives a first reflected wave reflected from a detection object.
Figure 7:
FIG. 7 is a view illustrating a strength of a signal received by a first signal transceiver when a first reflected wave is received.

FIG. 4 is a view illustrating a first embodiment of an operation of a processor, FIG. 5 is a view illustrating an example in which a first signal transceiver transmits a first electromagnetic wave, FIG. 6 is a view illustrating an example in which a first signal transceiver receives a first reflected wave reflected from a detection object, and FIG. 7 is a view illustrating a strength of a signal received by a first signal transceiver when a first reflected wave is received.

Referring to FIG. 4, the processor 120 may transmit an operation start control signal to the first signal transceiver 111-1 according to a predefined setting or the user's operation (121). The first signal transceiver 111-1 may radiate and transmit a first electromagnetic wave W11 in response to receiving the control signal (122). In this case, the second signal transceiver 111-2 may be controlled not to operate.

After receiving the operation start control signal, the first signal transceiver 111-1 may radiate the first electromagnetic wave W11 of a first frequency f11 continuously or periodically over the front surface of the display 190, as illustrated in FIG. 5. Here, the first frequency f11 may be relatively lower than a second frequency f12 (see FIG. 8) and a third frequency f21 (see FIG. 8) to be described later. In the same sense, the wavelength of the first electromagnetic wave W11 may be relatively longer than the wavelength of a second electromagnetic wave W12 (see FIG. 8) and a third electromagnetic wave W21 (see FIG. 8).

As illustrated in FIG. 6, when the detection object 10 comes into contact with or comes close to one side of the display 190, the first electromagnetic wave W11 may be reflected by the detection object 10, and the first signal transceiver 111-1 may receive a first reflected wave RW11 corresponding to the first electromagnetic wave W11 (123). Since the first frequency f11 of the first electromagnetic wave W11 is relatively low, it has a relatively strong diffraction. Accordingly, when the plurality of detection objects 10 exist at a plurality of points when the first electromagnetic wave W11 is radiated, the reflection is made on all or part of the plurality of detection objects 10. Therefore, the first reflected wave RW11 reflected at various distances may be transmitted to the first signal transceiver 111-1.

The first signal transceiver 111-1 may transmit the signal corresponding to the first reflected wave RW11 to the processor 120 (124).

When the processor 120 receives the signal corresponding to the first reflected wave RW11, the processor 120 may determine that the touch operation has been started in response (125). In this case, the radiated first electromagnetic wave W11 has the low first frequency f11 and strong diffraction as described above, so that the signal corresponding to the first reflected wave RW11 has a relatively low resolution, as illustrated in FIG. 7.

According to the embodiments, instead of the first signal transceiver 111-1, the second signal transceiver 111-2 may transmit the first electromagnetic wave W11 and receive the first reflected wave RW11, and the processor 120 may be provided to determine whether to start the touch operation based on the signal transmitted from the second signal transceiver 111-2. In addition, the first signal transceiver 111-1 and the second signal transceiver 111-2 may be designed to operate together to determine whether the touch operation is started.

Figure 8:
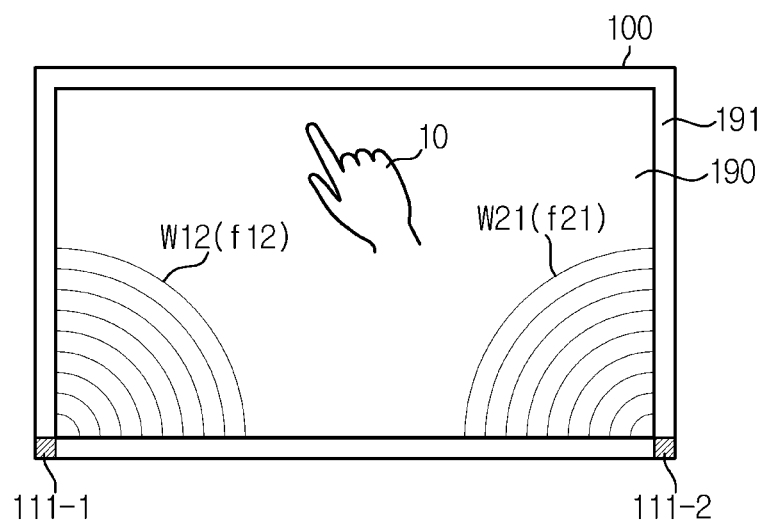
FIG. 8 is a view illustrating an example in which a first signal transceiver and a second signal transceiver transmit a second electromagnetic wave and a third electromagnetic wave.
Figure 9:
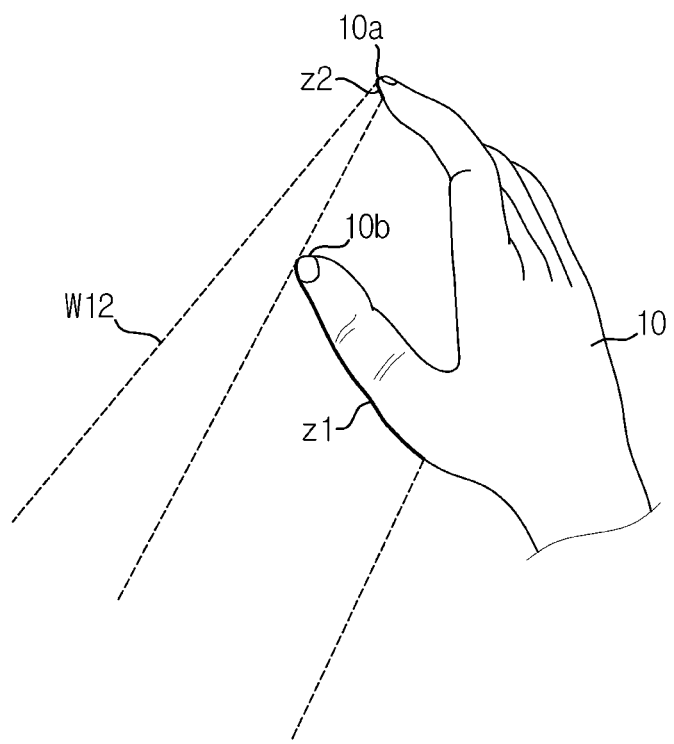
FIG. 9 is a view for describing a strength of a signal received by a first signal transceiver.

FIG. 8 is a view illustrating an example in which a first signal transceiver and a second signal transceiver transmit a second electromagnetic wave and a third electromagnetic wave, and FIG. 9 is a view for describing a strength of a signal received by a first signal transceiver.

When it is determined that the touch operation has been started, the processor 120 may transmit the operation start control signal to the first signal transceiver 111-1 and the second signal transceiver 111-2 (125, 126).

As illustrated in FIG. 8, the first signal transceiver 111-1 and the second signal transceiver 111-2 may start the operation in response to the reception of the operation start control signal to radiate the second electromagnetic wave W12 and the third electromagnetic wave W21 to the top of one surface of the display 190 (125-1, 126-1). In this case, the first signal transceiver 111-1 may radiate the second electromagnetic wave W12 of the second frequency f12, and the second signal transceiver 111-2 may radiate the third electromagnetic wave W21 of the third frequency f21. The second frequency f12 and the third frequency f21 may be the same as or different from each other. The second frequency f12 and the third frequency f21 may be relatively higher than the first frequency f11. In other words, the wavelength of the second electromagnetic wave W12 and the wavelength of the third electromagnetic wave W21 may be shorter than the wavelength of the first electromagnetic wave W11.

Each of the electromagnetic waves W12 and W21 radiated by the first signal transceiver 111-1 and the second signal transceiver 111-2 may be reflected by the detection object 10, thereby reflecting the reflected wave, that is, a second reflected wave RW12 and a third reflected wave RW21 may be transmitted to the first signal transceiver 111-1 and the second signal transceiver 111-2, respectively (125-2, 126-2). In other words, the first signal transceiver 111-1 may receive the second reflected wave RW12, and the second signal transceiver 111-2 may receive the third reflected wave RW21.

As illustrated in FIG. 9, when a plurality of objects (for example, a thumb end and one zone round it and an index finger end and one zone around it) exist on the path of the electromagnetic waves W12 and W21, the radiated electromagnetic wave, for example, the second electromagnetic wave W12, may be transmitted to the thumb end 10b and the zone z2 around it, and also the index finger end 10a and the zone z2 around it. In the thumb end 10b and the zone z2 around it, and the index finger end 10a and the zone z2 around it, the reflection generates independently. Accordingly, a plurality of the second reflected waves RW12 reflected at different points may be transmitted to the corresponding signal transceiver, for example, the first signal transceiver 111-1.

When the first signal transceiver 111-1 and the second signal transceiver 111-2 receive the reflected waves RW12 and RW21, the first signal transceiver 111-1 and the second signal transceiver 111-2 may independently transmit signals corresponding to the reflected waves RW12 and RW21 to the processor 120 (125-3, 126-3).

Figure 10:
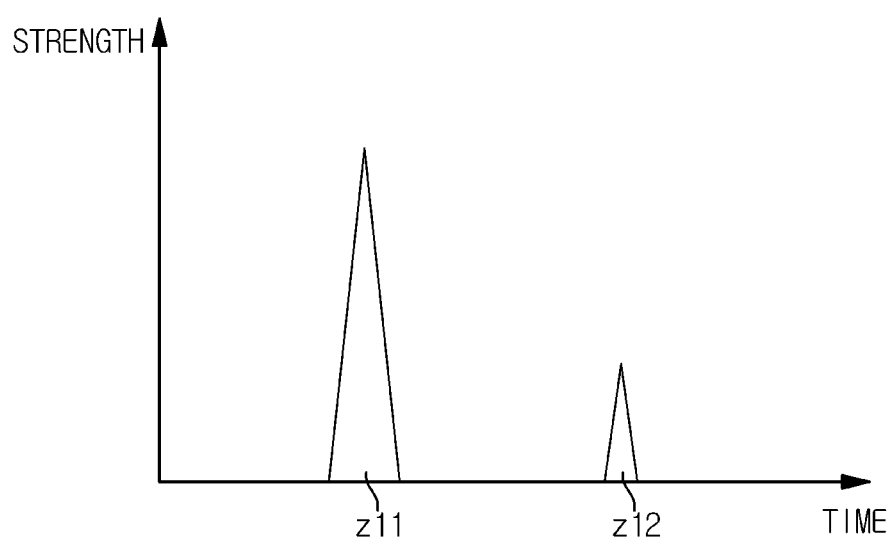
FIG. 10 is a graph illustrating a strength of a signal received by a first signal transceiver when a second reflected wave is received.

FIG. 10 is a graph illustrating a strength of a signal received by a first signal transceiver when a second reflected wave is received.

As described above, since the frequencies f12 and f21 of the second electromagnetic wave W12 and the third electromagnetic wave W21 are relatively high, the signal transmitted to the processor 120 has a relatively high resolution. If reflection is made at the plurality of objects 10a, 10b, z1, and z2, the processor 120 may receive a relatively strong signal at the plurality of points, for example, two time points z11 and z12, as illustrated in FIG. 10. Here, each of the time points z11 and z12 may correspond to the distance of each of the points z1 and z2 where the reflection is made.

According to the embodiments, the processor 120 may select any one of the plurality of time points z11 and z12, and may determine the position (i.e., a coordinate value) of the point at which the touch operation is performed based on the selected time point (any one of the time points z11 and z12) (127). For example, the processor 120 may determine the position corresponding to the index finger end 10a and the zone z2 around it as the position where the touch operation is performed among the plurality of points or zones where the reflections are made.

More specifically, for example, the processor 120 may select a signal of any one time point, for example, the first time point z12, from the electrical signal transmitted by the first signal transceiver 111-1, and calculate a distance corresponding to the selected signal based on a time difference between the selected first time point z12 and the time point at which the second electromagnetic wave W12 is radiated. Accordingly, the distance between the detection object 10a and the first signal transceiver 111-1 may be determined. Similarly, the processor 120 may perform the same process with respect to the signal corresponding to the third electromagnetic wave W21 received by the second signal transceiver 111-2. Accordingly, the distance between the detection object 10a and the second signal transceiver 111-2 may be determined. When the distances are determined, the processor 120 may determine the coordinates of the detection object 10a through the above-described calculation process. In other words, the processor 120 may obtain the coordinates of the position corresponding to the point corresponding to the first time point z12, for example, the index finger end 10a and one region z2 around the index finger. Accordingly, the position of the detection object 10a may be determined.

The processor 120 may select any one of the plurality of time points z11 and z12 that are relatively strong based on at least one of predefined profiles, learning algorithms, and the predefined user settings.

The profile may be predefined by the designer according to an experiment or experience, and may include information for selecting a specific point among relatively strong points. The processor 120 may select a point at which the signal strength corresponds to a specific range by viewing the profile, or may select a point located farthest or closest to the signal transceivers 111-1 and 111-2 among the plurality of time points z11 and z12.

The learning algorithms may include Deep Neural Network (DNN), Convolutional Neural Network (CNN), Recurrent Neural Network (RNN), Deep Belief Network (DBN) and Deep Q-Network. The processor 120 may generate or update the learning algorithms, and may select any one of the plurality of time points z11 and z12 based on the generated or updated learning algorithms. In this case, the processor 120 may receive, for example, a selection command for any one of the plurality of points from the user, and generate and update the learning algorithms based on the selection result of the user.

The user setting may include information defined by the user to select the specific point among relatively strong points. The user setting may be defined through a calibration process using a separately provided user interface.

As described above, when the position of the detection object 10a is determined, the processor 120 may perform the arithmetic processing corresponding to the determined position of the detection object 10a or generate the control signal to control the operation of the detection object positioning apparatus 100.

Hereinafter, the embodiments of the operation of the processor in the case where the first signal transceiver 111-1 and the second signal transceiver 111-2 are provided will be described with reference to FIGS. 11 to 14.

Figure 11:
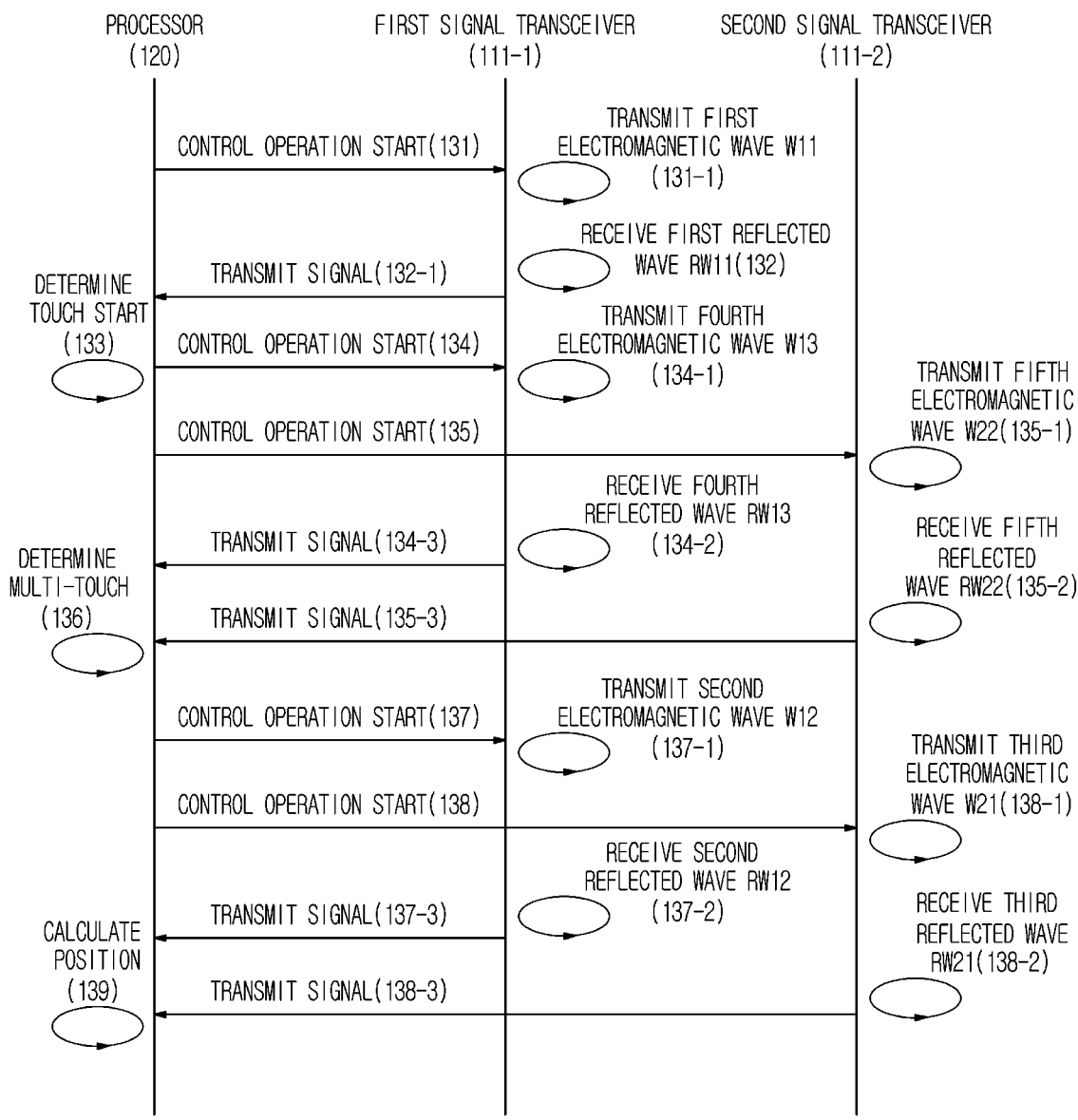
FIG. 11 is a view illustrating a second embodiment of an operation of a processor.
Figure 12:
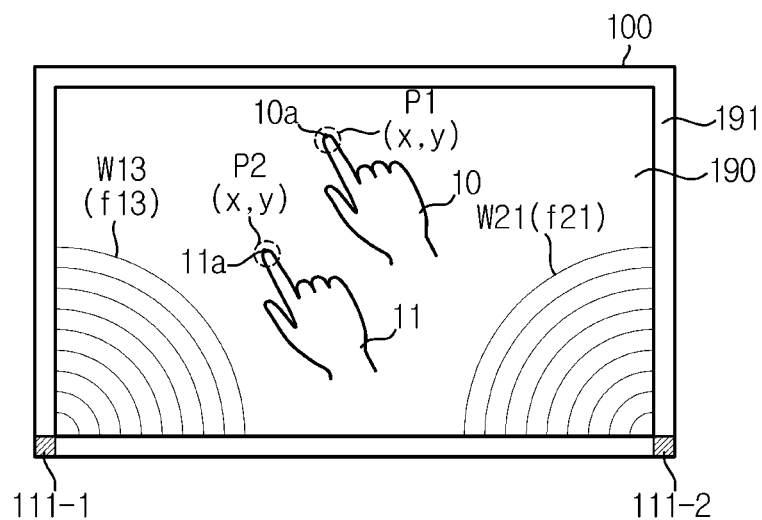
FIG. 12 is a view illustrating an example in which a first signal transceiver and a second signal transceiver transmit a fourth electromagnetic wave and a fifth electromagnetic wave.
Figure 13:
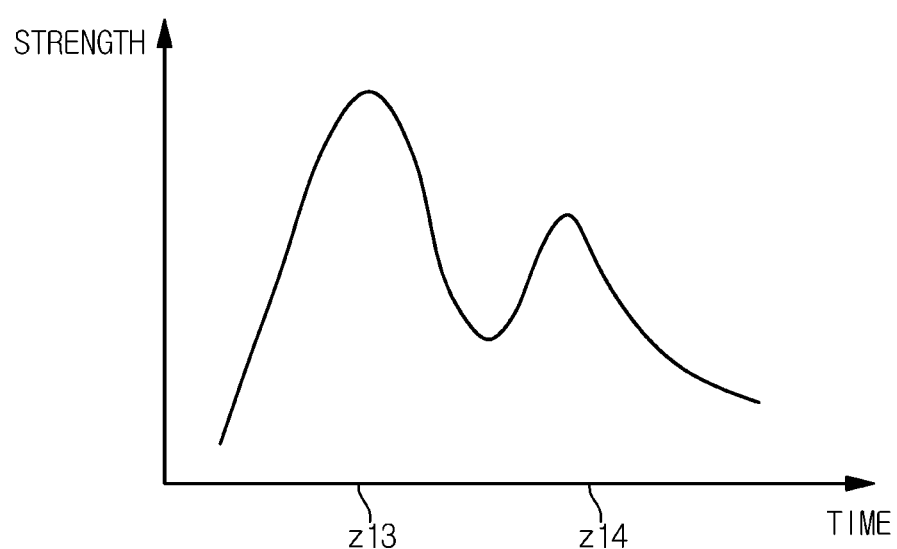
FIG. 13 is a graph illustrating a strength of a signal received by a first signal transceiver when a fourth reflected wave is received.

FIG. 11 is a view illustrating a second embodiment of an operation of a processor, FIG. 12 is a view illustrating an example in which a first signal transceiver and a second signal transceiver transmit a fourth electromagnetic wave and a fifth electromagnetic wave, and FIG. 13 is a graph illustrating a strength of a signal received by a first signal transceiver when a fourth reflected wave is received.

Referring to FIG. 11, the processor 120 may transmit the operation start control signal to the first signal transceiver 111-1 according to the predefined setting or the user's operation (131). The first signal transceiver 111-1 may transmit the first electromagnetic wave W11 of the first frequency f11 over the front surface of the display 190 continuously or periodically in response to receiving the control signal (131-1). As described above, the second signal transceiver 111-2 may be controlled not to operate. The frequency of the first electromagnetic wave W11 (i.e., the first frequency f11) may be set to be relatively lower than the second frequency f12 of the second electromagnetic wave W12, the third frequency f21 of the third electromagnetic wave W21, the frequency f13 of a fourth electromagnetic wave W13, and a fifth frequency f22 of a fifth electromagnetic wave W22 to be described later.

Referring to FIG. 12, when the detection objects 10 and 11 are in contact with or close to one surface of the display 190, the first signal transceiver 111-1 may receive the first reflected wave RW11 reflected by the detection object 10 (132). Subsequently, the first signal transceiver 111-1 may transmit the signal corresponding to the first reflected wave RW11 to the processor 120 (132-1). Here, the detection objects 10 and 11 may be plural. For example, two hands may perform the touch operation (hereinafter referred to as "multi-touch").

When the processor 120 receives the signal corresponding to the first reflected wave RW11, the processor 120 may determine that the touch operation has been started (133).

In this case, instead of the first signal transceiver 111-1, the second signal transceiver 111-2 may transmit the first electromagnetic wave W11 and receive the first reflected wave RW11.

When it is determined that the touch operation has been started, the processor 120 may transmit the operation start control signal to each of the first signal transceiver 111-1 and the second signal transceiver 111-2 (135, 136), as illustrated in FIG. 12. In response to receiving the operation start control signal, the fourth electromagnetic wave W13 of the fourth frequency f13 and the fifth electromagnetic wave W22 of the fifth frequency f22 may radiate to the top of one surface of the display 190 (134-1, 135-1).

Here, the fourth frequency f13 and the fifth frequency f22 may be the same as or different from each other. The fourth frequency f13 and the fifth frequency f22 may be relatively higher than the first frequency f11 and relatively lower than the second frequency f12 and the third frequency f21. In other words, the wavelength of the fourth electromagnetic wave W13 and the wavelength of the fifth electromagnetic wave W22 may be shorter than the wavelength of the first electromagnetic wave W11, and shorter than the wavelength of the second electromagnetic wave (W12 and the wavelength of the third electromagnetic wave W21. Therefore, the fourth electromagnetic wave W13 and the fifth electromagnetic wave W22 are relatively weaker in diffraction but stronger in resolution than the first electromagnetic wave W11, and are relatively stronger in diffraction but weaker in resolution than the second electromagnetic wave W12 and the third electromagnetic wave W21.

The fourth electromagnetic wave W13 radiated from the first signal transceiver 111-1 may be reflected by the detection object 10. The first signal transceiver 111-1 may receive a fourth reflected wave RW13 accordingly (134-2), and transmit the corresponding electrical signal to the processor 120 (134-3). Similarly, the fifth electromagnetic wave W22 radiated from the second signal transceiver 111-2 may be reflected by the detection object 10. The second signal transceiver 111-2 may receive a fifth reflected wave RW22 (135-2). The processor 120 may receive the signal corresponding to the fifth reflected wave RW22 (135-3).

The plurality of detection objects 10 and 11 may exist in the path of the electromagnetic wave. In this case, one detection object among the plurality of detection objects 10 and 11, for example, another detection object between the first detection objects 10 and 10a and the first signal transceiver 111-1, for example, the second detection objects 11 and 11a, may be located. Here, the detection objects 10, 10a, 11, and 11a may be different hands 10 and 11, or each of the finger ends 10a and 11a of the different hands 10 and 11, or different finger ends of the same hand. Since the fourth electromagnetic wave W13 and the fifth electromagnetic wave W22 are relatively diffractive, the fourth electromagnetic wave W13 and the fifth electromagnetic wave W22 may be reflected not only by the second detection object 11 but also by the first detection object 10 at the rear end thereof.

Accordingly, as illustrated in FIG. 13, the processor 120 may receive a signal having a stronger intensity than the other time points at a plurality of time points z13 and z14.

The processor 120 may determine a type of the transmitted signal. When the signal strength becomes relatively strong at the plurality of time points z13 and z14, the processor 120 may determine that the reflection is performed at the plurality of points, that is, the plurality of detection objects 10 and 11, and may determine that a multi-touch operation has been performed (136). On the contrary, when the transmitted signal is relatively strong only at a single time point, the processor 120 may determine that the multi-touch operation has not been performed. In other words, the processor 120 may determine that a single touch operation has been performed.

When it is determined that the multi-touch operation is performed, the processor 120 may transmit the operation start control signal to each of the first signal transceiver 111-1 and the second signal transceiver 111-2 to determine the exact correct point at which the touch operation is performed by the detection objects 10 and 11 (137, 138). As illustrated in FIG. 8, the first signal transceiver 111-1 and the second signal transceiver 111-2 may radiate the second electromagnetic wave W12 and the second frequency f12 and the third electromagnetic wave W21 of the third frequency f21 to the top of one surface of the display 190 in response to the reception of the operation start control signal (137-1, 138-1). The magnitudes of the second frequency f12 and the third frequency f21 are relatively higher than the magnitudes of the fourth frequency f13 and the fifth frequency f22. In other words, the second electromagnetic wave W12 of the second frequency f12 and the third electromagnetic wave W21 of the third frequency f21 are relatively diffracted but have a higher resolution than the fourth electromagnetic wave W13 of the fourth frequency f13 and the fifth electromagnetic wave W22 of the fifth frequency f22.

The electromagnetic waves W12 and W21 radiated by the first signal transceiver 111-1 and the second signal transceiver 111-2 may be reflected by the detection objects 10 and 11, and each of the first signal transceiver 111-1 and the second signal transceiver 111-2 may receive the second reflected wave RW12 and the third reflected wave RW21 corresponding thereto (137-2, 138-2). Each of the first signal transceiver 111-1 and the second signal transceiver 111-2 may transmit the electrical signal corresponding to the received second reflected wave RW12 and the third reflected wave RW21 to the processor 120 (137-3, 138-3). The processor 120 may calculate coordinate values P1 (x, y) and P2 (x, y) of each of the detection objects 10 and 11 using the electrical signals corresponding to the second reflected wave RW12 and the third reflected wave RW21 in the same or partially modified manner as described with reference to FIG. 10 (139). Accordingly, the processor 120 may obtain information about the positions of the plurality of detection objects 10 and 11.

When the position of each of the plurality of detection objects 10 and 11 is determined, the processor 120 may perform a corresponding operation/process according to the position of each of the plurality of detection objects 10 and 11, or may generate the control signal for the detection object positioning apparatus 100 to perform a corresponding operation.

Hereinafter, another embodiment of the detection object positioning apparatus 100 will be described with reference to FIGS. 14 to 20.

Figure 14:
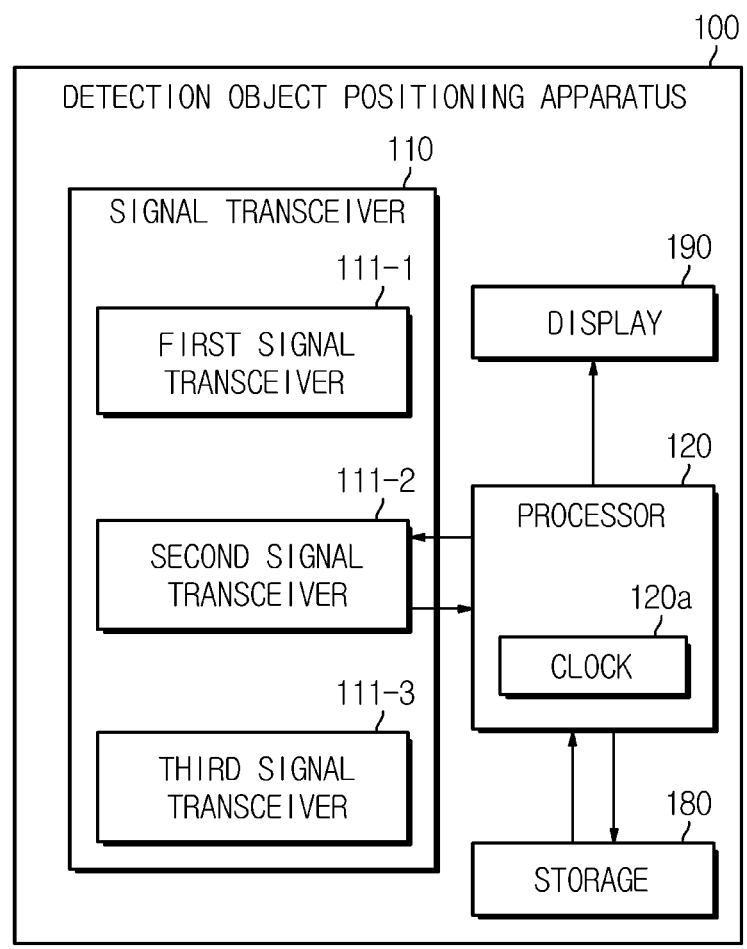
FIG. 14 is a block diagram illustrating another embodiment of a detection object positioning apparatus.
Figure 15:
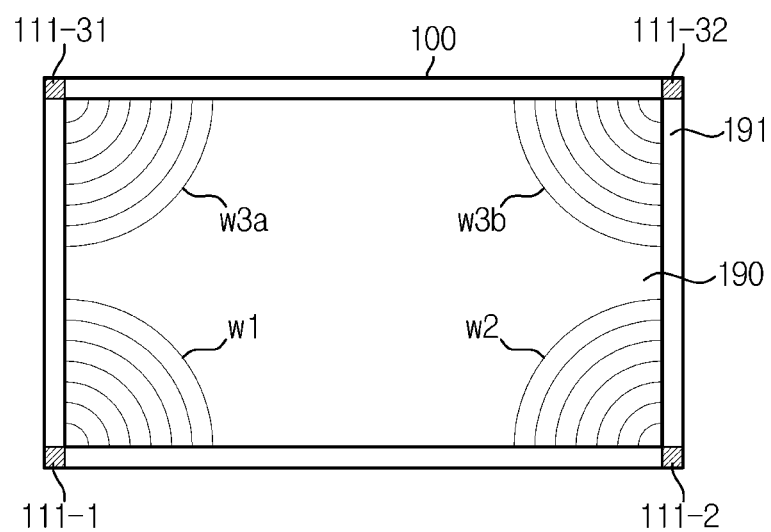
FIG. 15 is a view illustrating an example in which a plurality of third signal transceivers are further installed.

FIG. 14 is a block diagram illustrating another embodiment of a detection object positioning apparatus, and FIG. 15 is a view illustrating an example in which a plurality of third signal transceivers are further installed.

Referring to FIG. 14, the detection object positioning apparatus 100 may include the signal transceiver 110 and the processor 120, and may further include at least one of the storage 180 and the display 190 as necessary. Since detailed operations and structures of the signal transceiver 110, the processor 120, the storage 180, and the display 190 have already been described, overlapping descriptions thereof will be omitted.

According to an embodiment, the detection object positioning apparatus 100 may include the first signal transceiver 111-1, the second signal transceiver 111-2, and at least one third signal transceiver 111-3 (111-31, 111-32).

The first signal transceiver 111-1, the second signal transceiver 111-2, and the at least one third signal transceiver 111-3 may be implemented using devices that are the same as each other, or may be implemented using heterogeneous devices.

As illustrated in FIG. 15, the first signal transceiver 111-1, the second signal transceiver 111-2, and the at least one third signal transceiver 111-3 (111-31, 111-32) may start the operation according to the control signal transmitted from the processor 120, radiate the predetermined waves W1, W2, W3a, and W3b to the outside, and transmit the electrical signals corresponding to the reflected waves to the processor 120.

Referring to FIG. 15, the first signal transceiver 111-1, the second signal transceiver 111-2, and the at least one third signal transceiver 111-3 (111-31, 111-32) may be installed at different positions around the display 190, respectively.

For example, the first signal transceiver 111-1 may be installed at or near the bottom of the left end of the display 190 to radiate the electromagnetic wave W1 toward the display 190, and the second signal transceiver 111-2 may be installed at or near the bottom of the right end of the display 190 to radiate the electromagnetic wave W2 toward the display 190. In addition, the at least one third signal transceiver 111-3 (111-31, 111-32) may be installed at or near the top of the left and/or right ends of the display 190. If two of the third signal transceivers 113-31 and 113-32 are provided, any one of the third signal transceivers 111-31 may be installed at or near the top of the left end of the display 190. The third signal transceiver 111-32 may be provided at or near the top of the right end of the display 190 to radiate the electromagnetic wave W3b toward the display 190. In other words, the first signal transceiver 111-1, the second signal transceiver 111-2, and the at least one third signal transceiver 111-3 may each be installed at or around four corners of the display 190. According to an embodiment, the third signal transceivers 113-31 and 113-32 may be installed only at or near the top of the left end of the display 190, or may be installed only at or near the top of the right end of the display 190.

According to an embodiment, at least one of the first signal transceiver 111-1, the second signal transceiver 111-2, and the at least one third signal transceiver 111-3 may be installed to overlap a portion of the display 190, may be installed to not overlap, or may be installed in a front direction with respect to the display 190. The first signal transceiver 111-1, the second signal transceiver 111-2, and the at least one third signal transceiver 111-3 may be installed inside or outside the exterior housing 191.

Hereinafter, in the case where the first signal transceiver 111-1, the second signal transceiver 111-2, and the at least one third signal transceiver 111-3 (111-31, 111-32) are provided, the embodiments of the operation of the processor 120 will be described.

Figure 16:
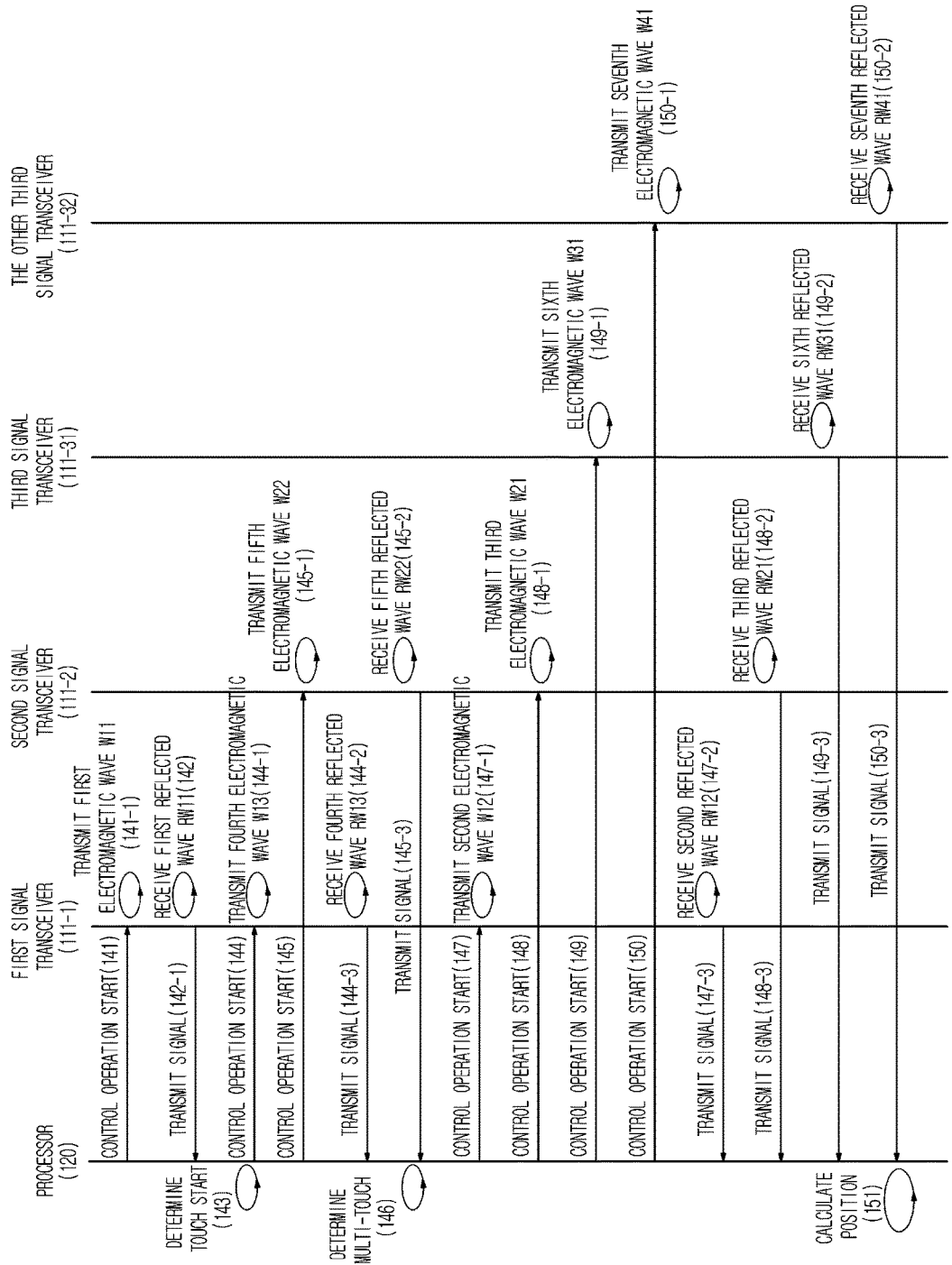
FIG. 16 is a view illustrating a second embodiment of an operation of a processor.
Figure 17:
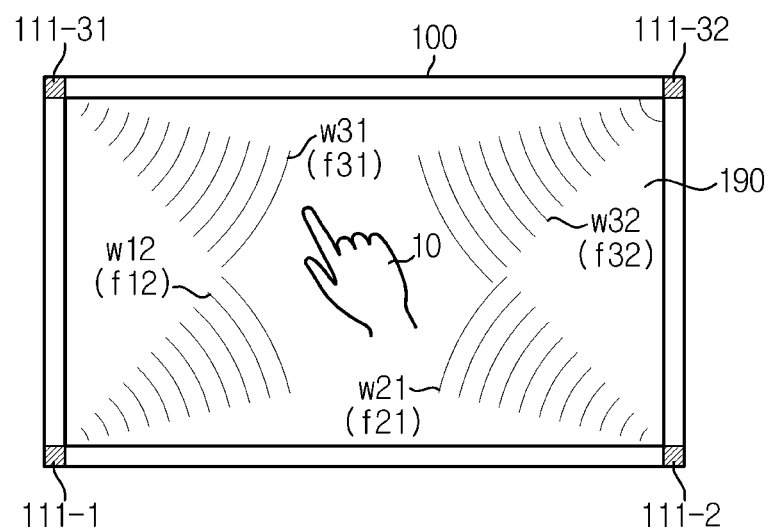
FIG. 17 is a view illustrating an example in which each signal transceiver transmits an electromagnetic wave.

FIG. 16 is a view illustrating a second embodiment of an operation of a processor, and FIG. 17 is a view illustrating an example in which each signal transceiver transmits an electromagnetic wave.

Referring to FIG. 16, the processor 120 may transmit the operation start control signal to the first signal transceiver 111-1 according to the predefined setting or the user's operation (141). The first signal transceiver 111-1 may transmit the first electromagnetic wave W11 of the first frequency f11 over the front surface of the display 190 continuously or periodically in response to receiving the control signal (141-1). Since the control signal is not transmitted to the second signal transceiver 111-2, the second signal transceiver 111-2 does not radiate the electromagnetic wave. When at least one of the detection objects 10 and 11 is in contact with or close to one surface of the display 190, the first signal transceiver 111-1 may receive the first reflected wave RW11 reflected by the detection object 10 (142), and may transmit the signal corresponding to the first reflected wave RW11 to the processor 120 (142-1). When the processor 120 receives the signal corresponding to the first reflected wave RW11, the processor 120 may determine that the touch operation has been started (143). As described above, according to the embodiment, the processor 120 may determine whether to start the touch operation by operating the second signal transceiver 111-2 instead of the first signal transceiver 111-1.

When it is determined that the touch operation has been started, the processor 120 may transmit the operation start control signal to the first signal transceiver 111-1 and the second signal transceiver 111-2 (145, 146). Each of the first signal transceiver 111-1 and the second signal transceiver 111-2 may radiate the fourth electromagnetic wave W13 having the fourth frequency f13 that is relatively higher than the first frequency f11 and the fifth electromagnetic wave W22 having the fifth frequency f22 that is relatively higher than the first frequency f11 according to the operation start control signal (144-1, 145-1).

The first signal transceiver 111-1 and the second signal transceiver 111-2 may receive the fourth reflected wave RW13 corresponding to the fourth electromagnetic wave W13 and the fifth reflected wave RW22 corresponding to the fifth electromagnetic wave W22, respectively (145-2 and 145-2), and may transmit the electrical signals corresponding to the received reflected waves RW13 and RW22 to the processor 120 (144-3 and 145-3).

As described above, the processor 120 may determine the type of the signal transmitted from each of the first signal transceiver 111-1 and the second signal transceiver 111-2. When the signal strength becomes relatively strong at the plurality of time points, the processor 120 may determine that the reflection is performed at the plurality of points, that is, the plurality of detection objects 10 and 11. In other words, the processor 120 may determine that the multi-touch operation has been performed (146).

When it is determined that the multi-touch operation has been performed, the processor 120 may transmit the operation start control signal of each of the first signal transceiver 111-1, the second signal transceiver 111-2, and the at least one third signal transceiver 111-3 (147, 148, 149, 150). Accordingly, as illustrated in FIG. 17, the first signal transceiver 111-1, the second signal transceiver 111-2, and the at least one third signal transceiver 111-3 may be controlled to radiate electromagnetic waves W12, W21, W31, and W41 of predetermined frequencies f11, f21, f31, and f32, respectively (147-1, 148-1, 149-1, 150-1). Hereinafter, the electromagnetic wave W31 output from one of the third signal transceivers 111-31 is called a sixth electromagnetic wave, and an electromagnetic wave W32 output from the other third signal transceiver 111-32 is called a seventh electromagnetic wave.

The second frequency f12 of the second electromagnetic wave W12, the third frequency f21 of the third electromagnetic wave W21, the frequency f31 of the sixth electromagnetic wave W31, and a frequency f41 of the seventh electromagnetic wave W41 may be the same or different from each other.

Further, the second frequency f12 of the second electromagnetic wave W12, the third frequency f21 of the third electromagnetic wave W21, the frequency f31 of the sixth electromagnetic wave W31, and the frequency f41 of the seventh electromagnetic wave W41 may be relatively higher than the first frequency f11 of the first electromagnetic wave W11, the frequency f13 of the fourth electromagnetic wave W13, and the fifth frequency f22 of the fifth electromagnetic wave W22. Accordingly, the second electromagnetic wave W12, the third electromagnetic wave W21, the sixth electromagnetic wave W31, and the seventh electromagnetic wave W41 may be relatively diffracted and higher in resolution than the other electromagnetic waves W11, W13, and W22.

Each of the first signal transceiver 111-1, the second signal transceiver 111-2, and the at least one third signal transceiver 111-3 may receive the second reflected wave RW12 corresponding to the second electromagnetic wave W12, the third reflected wave RW21 corresponding to the third electromagnetic wave W21, a sixth reflected wave RW31 corresponding to the sixth electromagnetic wave W31, and a seventh reflected wave RW41 corresponding to the seventh electromagnetic wave W41 (147-2, 148-2, 149-2, 150-2). Of course, some of the first signal transceiver 111-1, the second signal transceiver 111-2, and the at least one third signal transceiver 111-3 may not receive the reflected waves RW12, RW21, RW31, and RW41.

The electrical signals corresponding to the received reflected waves RW12, RW21, RW31, and RW41 may be transmitted to the processor 120 (147-3, 148-3, 149-3, 150-3), and the processor 120 may calculate the position of the detection object, for example, the index finger end 10a and zones (z4 in FIG. 18 or z5 in FIG. 20A) around it based on the received electrical signals (151).

Figure 18:
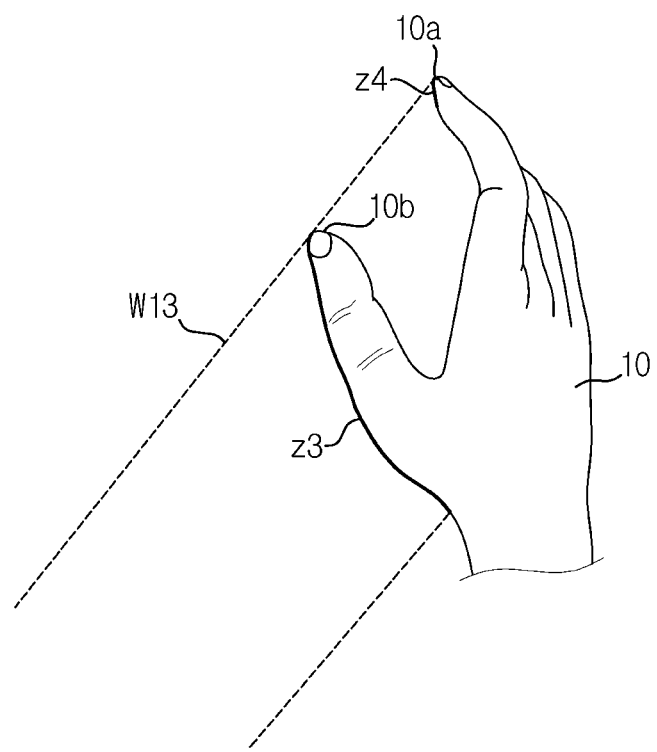
FIG. 18 is a view for describing a strength of a signal received by a first signal transceiver.
Figure 19:
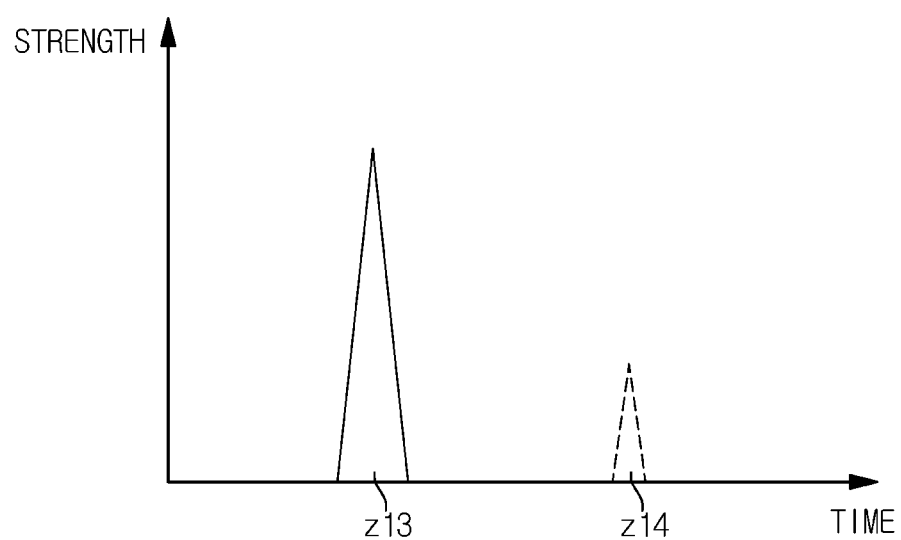
FIG. 19 is a graph for describing a strength of a signal received by a first signal transceiver.
Figure 20A:
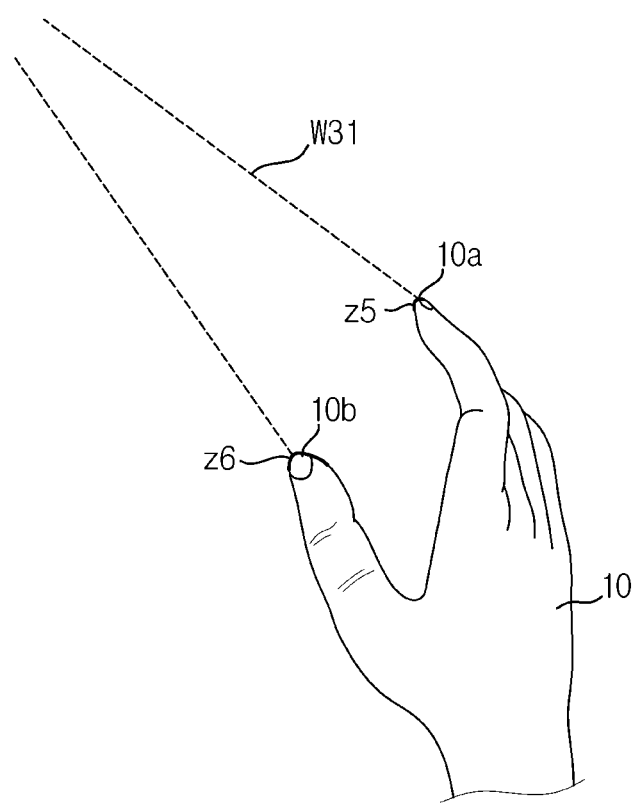
FIG. 20A is a view for describing a strength of a signal received by a third signal transceiver.
Figure 20B:
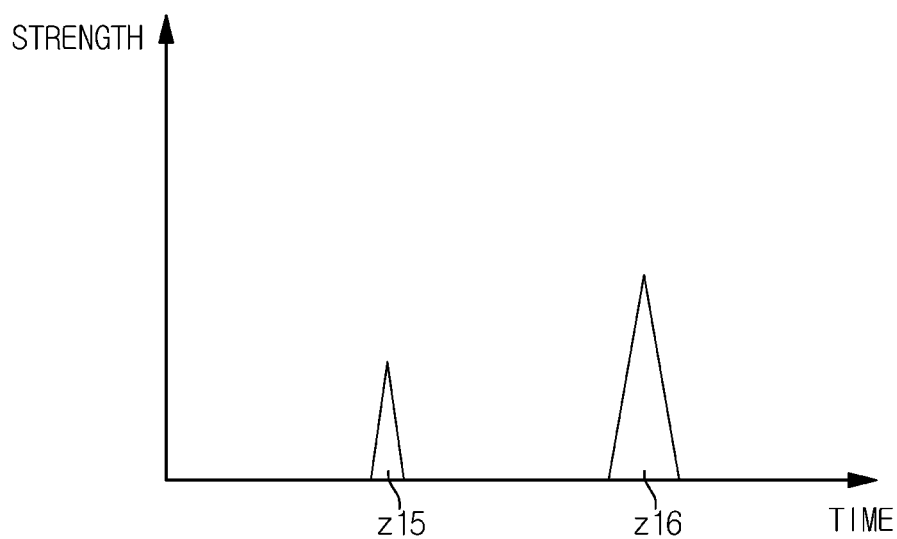
FIG. 20B is a graph for describing a strength of a signal received by a third signal transceiver.

FIG. 18 is a view for describing a strength of a signal received by a first signal transceiver, and FIG. 19 is a graph for describing a strength of a signal received by a first signal transceiver. FIG. 20A is a view for describing a strength of a signal received by a third signal transceiver, and FIG. 20B is a graph for describing a strength of a signal received by a third signal transceiver.

When the electromagnetic waves W12 and W21 of the high frequencies f12 and f21 are radiated, the electromagnetic waves W12 and W21 have relatively weak diffraction. Therefore, as illustrated in FIG. 18, when any one of the objects (for example, the thumb end 10b and the zone z3 around it) is placed on the path of the electromagnetic waves to the other objects (for example, the index finger end 10a and the zone z4 around it), the electromagnetic waves W12 and W21 of the high frequencies f12 and f21 may not be substantially diffracted in any one of the objects 10b and the zone z3 around it, and thus may hardly be transmitted to the other objects 10a and the zone z4 around it. As a result, almost no reflected waves are generated in the other objects 10a and the zone z4 around it. Accordingly, the reflected waves corresponding to the other objects, for example, the index finger end 10a and the zone z4 around it, are hardly transmitted to the first signal transceiver 111-1.

As illustrated in FIG. 19, the first signal transceiver 111-1 may output a relatively strong electrical signal only at the specific time point z13. In other words, different from that illustrated in FIG. 10, the signal strength does not become relatively strong at the later time point z14. Therefore, the processor 120 cannot recognize the index finger end 10a and the zone z4 around it as the detection object.

As shown in FIG. 17, when the first signal transceiver 111-1, the second signal transceiver 111-2, and the at least one third signal transceiver 111-3 disposed in different positions from each other radiate the electromagnetic waves W12, W21, W31, and W41 of the high frequencies f12, f21, f31, and f32, respectively, the electromagnetic waves W12, W21, W31, and W41 may be transmitted to the index finger end 10a and the zone z4 around it.

For example, as illustrated in FIG. 20A, the sixth electromagnetic wave W31 radiated from the at least one third signal transceiver 111-3 may reach a position where the second electromagnetic wave W12 radiated from the first signal transceiver 111-1 cannot reach (i.e., the index finger end 10*a* and the zone z5 around it). Accordingly, in another signal transceiver, for example, the at least one third signal transceiver 111-3 may output the electrical signal corresponding to a position where the second electromagnetic wave W12 radiated from the first signal transceiver 111-1 cannot reach at the specific time point z5. The electrical signal corresponding to the position can be output. Of course, at a specific time point z6, the third signal transceiver 111-3 may output the electrical signal corresponding to a position where the second electromagnetic wave W12 radiated from the first signal transceiver 111-1 is reachable.

As illustrated in FIG. 19, although the signal corresponding to the specific point z4 is not obtained from the first signal transceiver 111-*a*, the processor 120 may determine a distance between the detection object (i.e., the index finger end 10*a* and the zone z5 around it) and the at least one third signal transceiver 111-3 based on the signal corresponding to the specific point z5 obtained by the other signal transceiver, for example, the at least one third signal transceiver 111-3. Similarly, the processor 120 may further determine the distance between the detection object and the second signal transceiver 111-2 and/or the distance between the detection object and the at least one third signal transceiver 111-3. The processor 120 may obtain the coordinates of the position of the detection object based on the distances determined as described above.

Therefore, as illustrated in FIGS. 18 and 19, even if the first signal transceiver 111-1 does not receive the second reflected wave RW12 reflected from the detection object, at least one of the other signal transceivers 111-2, 111-31, and 111-32 may receive the reflected waves RW21, RW31, and R41 reflected from the detection object, and may determine the exact position of the detection object based on the corresponding electrical signal.

Hereinafter, another embodiment of the detection object positioning apparatus 100 will be described with reference to FIGS. 21 to 25B.

Figure 21:
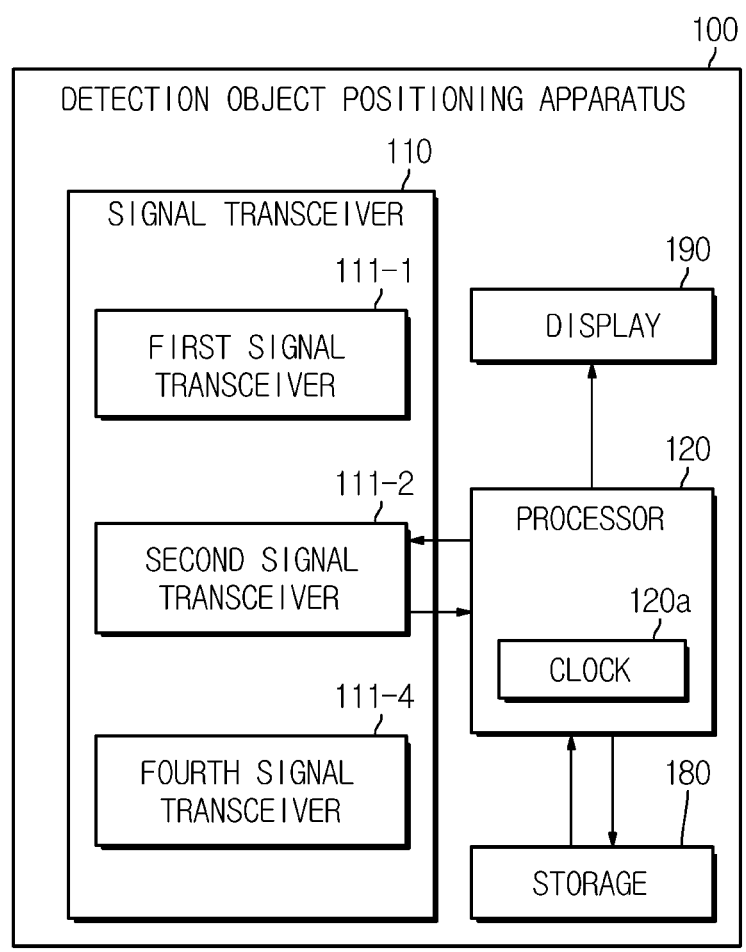
FIG. 21 is a block diagram illustrating another embodiment of a detection object positioning apparatus.
Figure 22:
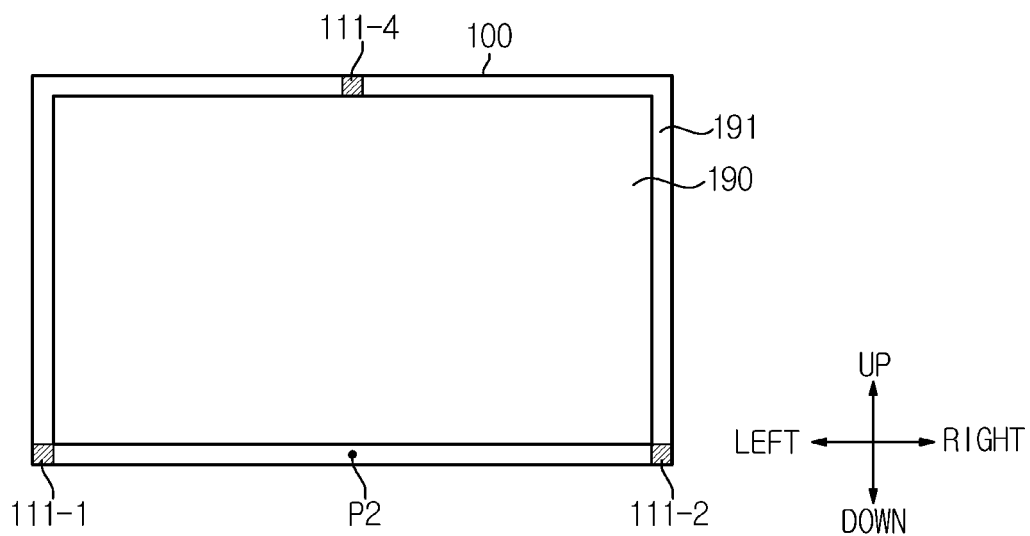
FIG. 22 is a front view illustrating another embodiment of a detection object positioning apparatus.
Figure 23:
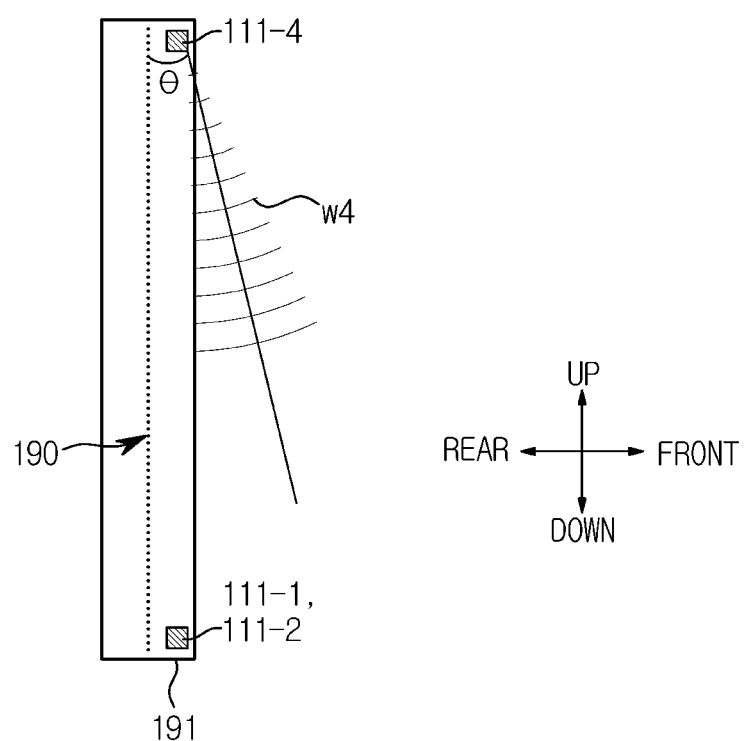
FIG. 23 is a side view illustrating another embodiment of a detection object positioning apparatus.

FIG. 21 is a block diagram illustrating another embodiment of a detection object positioning apparatus, FIG. 22 is a front view illustrating another embodiment of a detection object positioning apparatus, and FIG. 23 is a side view illustrating another embodiment of a detection object positioning apparatus.

Referring to FIG. 21, the detection object positioning apparatus 100 may include the signal transceiver 110 and the processor 120. The detection object positioning apparatus 100 may further include at least one of the storage 180 and the display 190 according to the embodiment. Since detailed operations and structures of the signal transceiver 110, the processor 120, the storage 180, and the display 190 have already been described, overlapping descriptions thereof will be omitted.

According to the embodiment, the detection object positioning apparatus 100 may include the first signal transceiver 111-1, the second signal transceiver 111-2, and a fourth signal transceiver 111-4. The first signal transceiver 111-1, the second signal transceiver 111-2, and the fourth signal transceiver 111-4 may be implemented using a device capable of radiating and receiving homogeneous or heterogeneous waves.

The first signal transceiver 111-1, the second signal transceiver 111-2, and the fourth signal transceiver 111-4 may start the operation according to the control signal transmitted from the processor 120 to radiate the predetermined wave to the outside, to receive the reflected wave corresponding to the wave reflected and radiated by the detection object, and to transmit the electrical signal corresponding to the reflection wave to the processor 120.

Referring to FIG. 22, the first signal transceiver 111-1, the second signal transceiver 111-2, and the fourth signal transceiver 111-4 may be installed around the display 190, respectively.

In particular, the first signal transceiver 111-1 may be installed at or near the bottom of the left end of the display 190 to radiate the electromagnetic wave W1 toward the display 190, and the second signal transceiver 111-2 may be installed at or near the bottom of the right end of the display 190 to radiate the electromagnetic wave W2 toward the display 190.

According to the embodiment, at least one of the first signal transceiver 111-1 and the second signal transceiver 111-2 may be installed to be inclined with respect to the display 190 in the same manner as the fourth signal transceiver 111-4, which will be described later.

According to the embodiment, the fourth signal transceiver 111-4 may be installed on the top of the display 190. In this case, the fourth signal transceiver 111-4 may be installed at or around the center of the top of the display 190, but the position thereof is not limited to the center or the periphery thereof. For example, the fourth signal transceiver 111-4 may be installed around at least one of both ends of the top of the display 190. According to another embodiment, the fourth signal transceiver 111-4 may be installed at a point p2 at the bottom of the display 190. Even in this case, the fourth signal transceiver 111-4 may be installed at or around the center of the bottom of the display 190, or at another point, for example, at or around at least one of both ends of the bottom of the display 190.

As illustrated in FIG. 23, the fourth signal transceiver 111-4 may be installed to be inclined with respect to the display 190. In other words, the fourth signal transceiver 111-4 may be installed in the detection object positioning apparatus 100 such that the wave output by the fourth signal transceiver 111-4, for example, the electromagnetic wave W4 can be radiated while the predominant radiation direction maintains a substantially constant angle $\theta$ with the plane that forms the front surface of the display 190. The angle $\theta$ between the fourth signal transceiver 111-4 and the display 190 may be variously defined according to a possible position of the 3D touch operation. The angle $\theta$ between the fourth signal transceiver 111-4 and the display 190 may be adjustable in some embodiments. In other words, the fourth signal transceiver 111-4 may be provided to be rotatable about a predetermined axis orthogonal to one plane of the display 190. To this end, the fourth signal transceiver 111-4 may be furthered coupled to a shaft member. If necessary, the fourth signal transceiver 111-4 may be provided to be rotated by driving of a separate motor connected to the shaft member. In this case, the angle $\theta$ may be adjusted according to the control of the processor 120.

As described above, at least one of the first signal transceiver 111-1, the second signal transceiver 111-2, and the fourth signal transceiver 111-4 may be installed so as to overlap a portion of the display 190 or may be installed so as not to overlap, according to the embodiment. The first signal transceiver 111-1, the second signal transceiver 111-2, and the fourth signal transceiver 111-4 may be installed in the front direction with respect to the display 190. In addition, the first signal transceiver 111-1, the second signal transceiver 111-2, and the fourth signal transceiver 111-4 may be installed inside or outside the exterior housing 191.

Hereinafter, in the detection object positioning apparatus 100 provided with the first signal transceiver 111-1, the second signal transceiver 111-2, and the fourth signal transceiver 111-4, the embodiment of the operation of the processor 120 will be described in detail.

Figure 24:
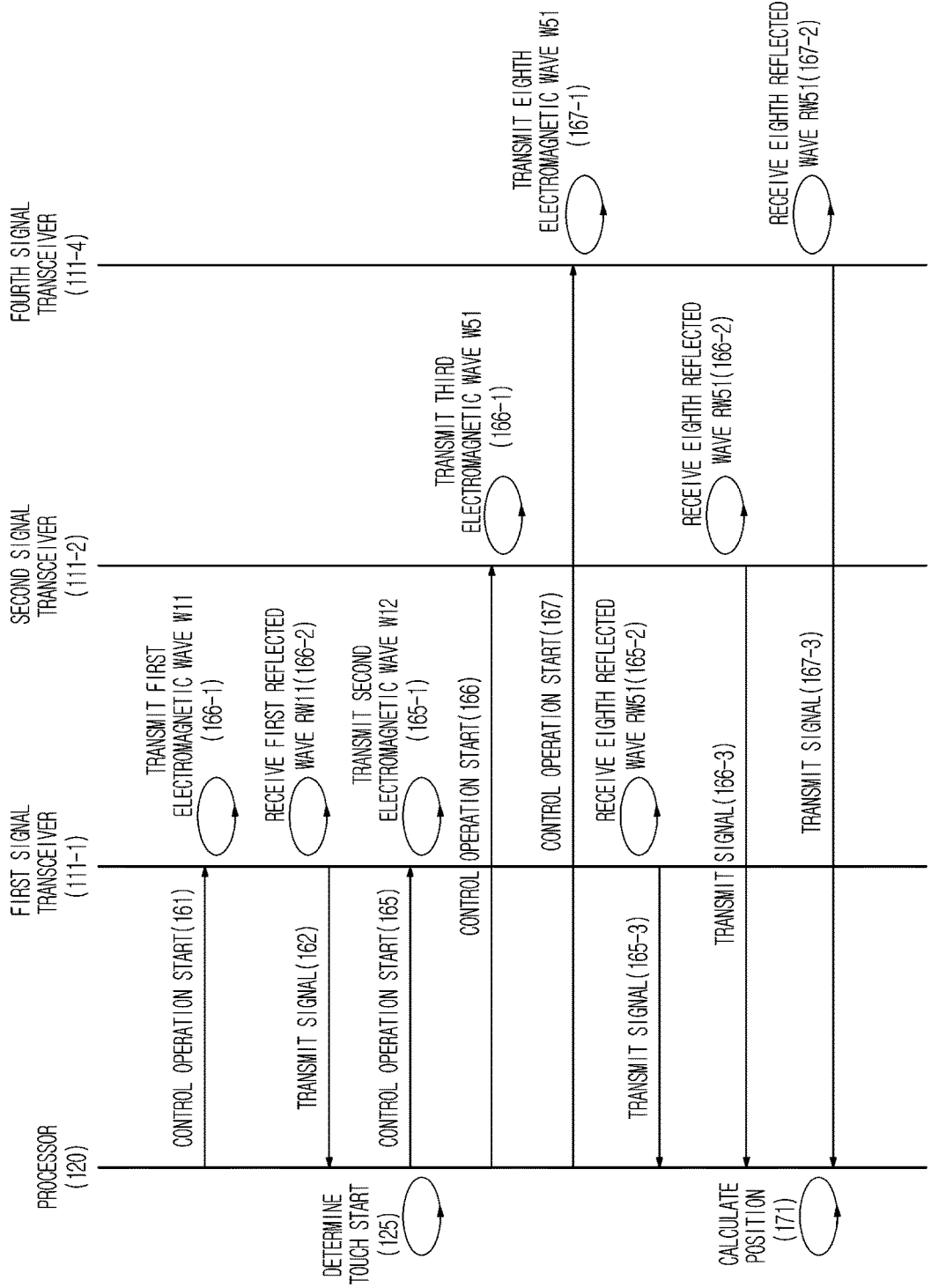
FIG. 24 is a view illustrating a fourth embodiment of an operation of a processor.
Figure 25A:
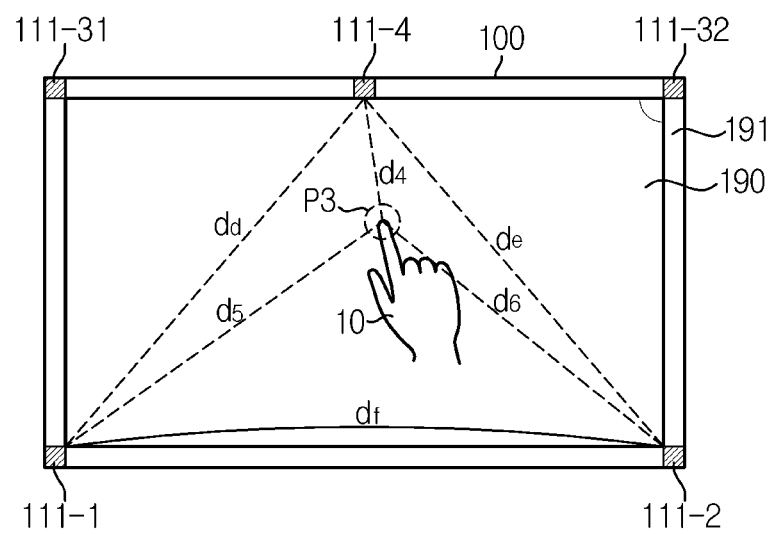
FIG. 25A is a front view illustrating an example of detecting a three-dimensional (3D) touch operation and a 3D touch operation position of a detection object.
Figure 25B:
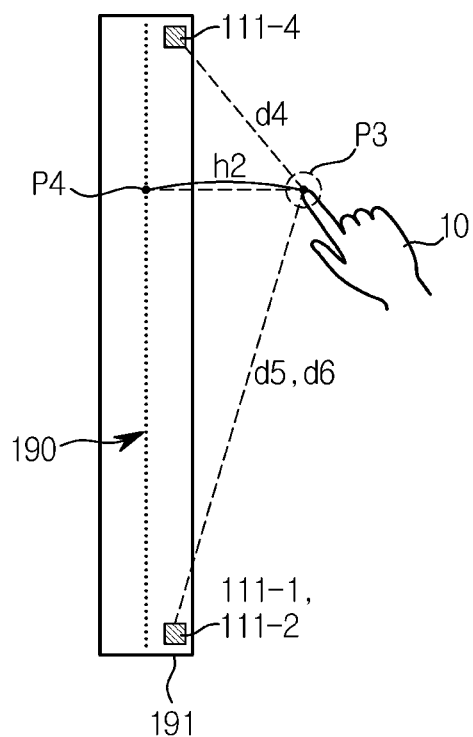
FIG. 25B is a side view illustrating an example of detecting a 3D touch operation and a 3D touch operation position of a detection object.

FIG. 24 is a view illustrating a fourth embodiment of an operation of a processor, FIG. 25A is a front view illustrating an example of detecting a three-dimensional (3D) touch operation and a 3D touch operation position of a detection object, and FIG. 25B is a side view illustrating an example of detecting a 3D touch operation and a 3D touch operation position of a detection object.

As illustrated in FIG. 24, the processor 120 may transmit the operation start control signal to the first signal transceiver 111-1 according to the user's operation or the pre-defined setting (161), and the first signal transceiver 111-1 may transmit the first electromagnetic wave W11 of the first frequency f11 onto one surface of the display 190 in response to the operation start control signal (166-1). As described above, the first frequency f11 may include a relatively low frequency. When receiving the first reflected wave RW11 corresponding to the first electromagnetic wave W11 (166-2), the first signal transceiver 111-1 may output the electrical signal corresponding to the first reflected wave RW11 and transmit the electrical signal to the processor 120 (162). The processor 120 may determine that the touch operation for the display 190 has been started according to the reception of the electrical signal corresponding to the first reflected wave RW11 (125). In this case, the processor 120 may transmit the operation start control signal to at least one of the second signal transceiver 111-2 and the fourth signal transceiver 111-4 instead of the first signal transceiver 111-1. The processor 120 may determine whether to start the touch operation based the electrical signal transmitted from at least one of the transceiver 111-2 and the fourth signal transceiver 111-4.

When it is determined that the touch operation for the display 190 has been started, the processor 120 may transmit the operation start control signals to the first signal transceiver 111-1, the second signal transceiver 111-2, and the fourth signal transceiver 111-4, respectively (165, 166, 167). In response, each of the first signal transceiver 111-1, the second signal transceiver 111-2, and the fourth signal transceiver 111-4 may transmit the second electromagnetic wave W12, the third electromagnetic wave W21, and an eighth electromagnetic wave W51 (165-1, 166-1, 167-1).

As illustrated in FIG. 24, the transmitted second electromagnetic wave W12, the third electromagnetic wave W21 and the eighth electromagnetic wave W51 may be reflected by the detection object 10. The first signal transceiver 111-1, the second signal transceiver 111-2, and the fourth signal transceiver 111-4 may receive the first reflected wave RW11, the third reflected wave RW21, and an eighth reflected wave RW51, respectively (165-2, 166-2, 167-2), and may transmit the electrical signals corresponding to the received reflected waves RW11, RW21, and RW51 to the processor 120 (165-3, 166-3, 167-3).

The processor 120 may determine the position of the detection object 10 by calculating a 3D coordinate of the detection object 10 based on the received electrical signal, and may perform a predetermined operation, processing and/or control operation corresponding to the position of the detection object 10 determined as necessary.

Particularly, for example, if the first signal transceiver 111-1, the second signal transceiver 111-2, and the fourth signal transceiver 111-4 are all formed inclined, the processor 120 may calculate a distance d5 between the first signal transceiver 111-1 and the detection object 10, a distance d6 between the second signal transceiver 111-2 and the detection object 10, a distance d4 between the fourth signal transceiver 111-4 and the detection object 10 using the electrical signal and the clock 120a output from the first signal transceiver 111-1, the second signal transceiver 111-2, and the fourth signal transceiver 111-4. Since a distance dd between the first signal transceiver 111-1 and the fourth signal transceiver 111-4, a distance de between the second signal transceiver 111-2 and the fourth signal transceiver 111-4, and a distance df between the first signal transceiver 111-1 and the second signal transceiver 111-2 are known values, a calculation of a shortest distance h2 between a point P3 where the detection object 10 is located and a point P4 on the display 190 and the coordinates on the plane of the point P4 on the display 190 may be calculated. Accordingly, a coordinate value of the point P3 where the detection object 10 is located may be calculated, and the processor 120 may obtain the position of the detection object 10.

If the first signal transceiver 111-1 and the second signal transceiver 111-2 are formed so as not to be inclined, the processor 120 may obtain the x-y axis coordinates of the detection object 10 on the plane of the display 190 based on the distance between the first signal transceiver 111-1 and the detection object 10 and the distance between the second signal transceiver 111-2 and the detection object 10. Subsequently, the processor 120 may calculate the shortest distance h2 between the point P3 where the detection object 10 is located and the point P4 on the display 190 using a Pythagorean theorem or a sine function based on the distance between the calculated detection object 10 and the fourth signal transceiver 111-4 and the distance d4 between the fourth signal transceiver 111-4 and the detection object 10. Accordingly, the coordinate value of the point P3 where the detection object 10 is located may be calculated, and the processor 120 may obtain the position of the detection object 10.

Hereinafter, various embodiments of a detection object positioning method will be described with reference to FIGS. 26 and 27.

Figure 26:
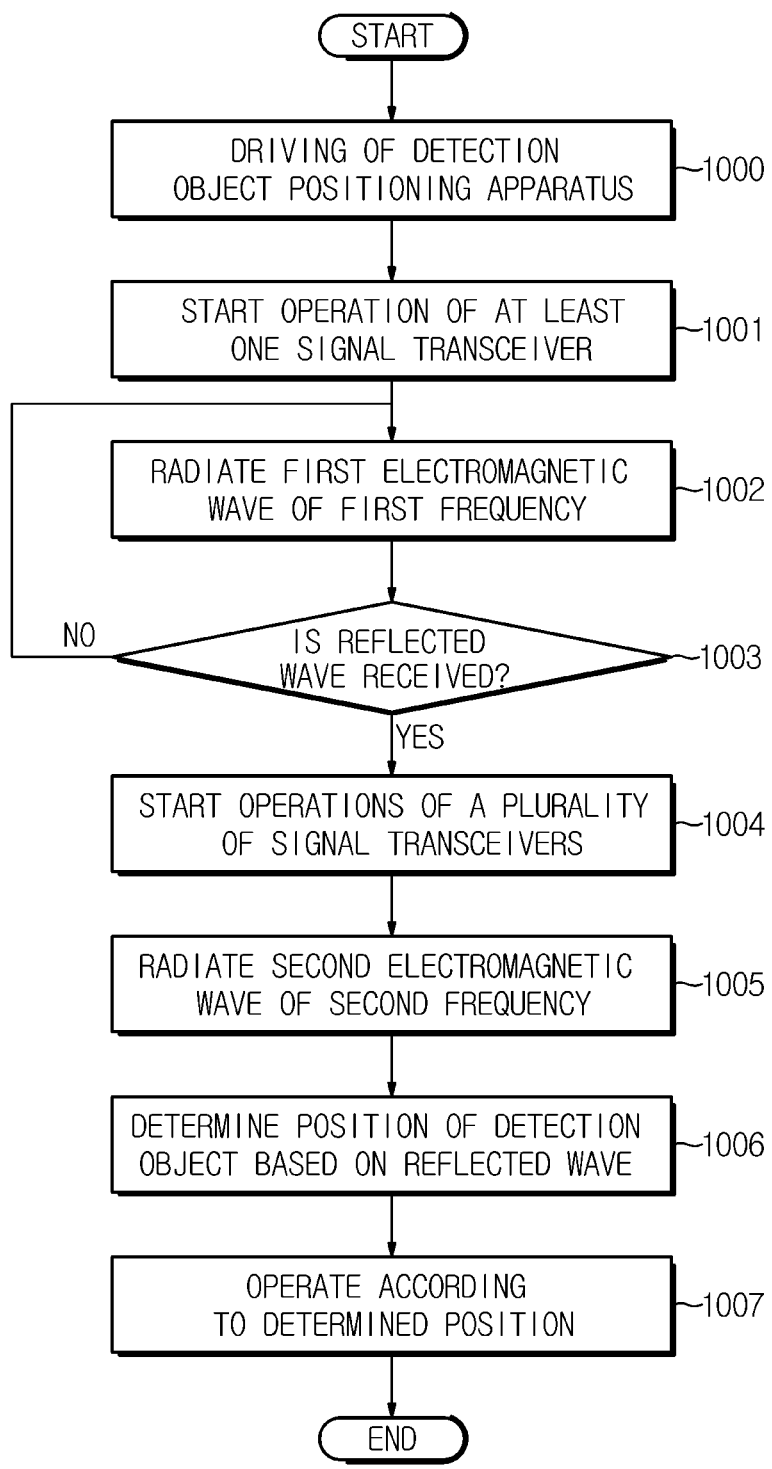
FIG. 26 is a flowchart of a first embodiment of a detection object positioning method.

FIG. 26 is a flowchart of a first embodiment of a detection object positioning method.

Referring to FIG. 26, the detection object positioning apparatus 100 may start driving (1000).

When the detection object positioning apparatus 100 starts the driving, at least one signal transceiver of the plurality of signal transceivers provided in the detection object positioning apparatus 100 may start the driving (1001). In this case, it is also possible that only one signal transceiver of the plurality of signal transceivers, for example, the first signal transceiver, may start the driving. Here, the plurality of signal transceivers may be installed around one surface of the detection object positioning apparatus 100. For example, when the detection object positioning apparatus 100 is the display apparatus, the plurality of signal transceivers may be installed around the display.

The at least one signal transceiver may radiate the first electromagnetic wave of the first frequency (1002). The first frequency may refer to a frequency having a value relatively lower than the second frequency, the third frequency, the sixth frequency, the seventh frequency, and/or the eighth frequency, which will be described later. The first electromagnetic wave may be diffractive because of its relatively low frequency, but its resolution is weak. The at least one signal transceiver may radiate the first electromagnetic wave continuously or periodically.

When the detection object is in contact with or close to one surface of the detection object positioning apparatus 100, the first electromagnetic wave may be reflected by the detection object 10, and the first reflected wave corresponding to the first electromagnetic wave may be transmitted to the at least one signal transceiver.

When the at least one signal transceiver receives the first electromagnetic wave (YES in 1003), the processor 120 provided in the detection object positioning apparatus 100 may determine that the touch operation has been started. In response, the processor 120 may transmit the control signal to at least two signal transceivers of the plurality of signal transceivers, and the at least two signal transceivers that receive the control signal may start the operation (1004).

The at least two signal transceivers each radiate the electromagnetic waves of the predetermined frequency (1005). For example, the two signal transceivers may radiate the second electromagnetic wave of the second frequency and the third electromagnetic wave of the third frequency. When three or more of the signal transceivers are provided, each of the signal transceivers may radiate the second electromagnetic wave of the second frequency, the third electromagnetic wave of the third frequency, the sixth electromagnetic wave of the sixth frequency, the seventh electromagnetic wave of the seventh frequency, and/or the eighth electromagnetic wave of the eighth frequency. Here, at least one of the at least two signal transceivers may be formed to be inclined with respect to one plane of the detection object positioning apparatus 10. In addition, the second frequency, the third frequency, the sixth frequency, the seventh frequency, and the eighth frequency may be frequencies having a relatively higher value than the first frequency. Accordingly, the second electromagnetic wave, the third electromagnetic wave, the sixth electromagnetic wave, the seventh electromagnetic wave, and the eighth electromagnetic wave may have relatively low diffraction and high resolution.

The radiated second electromagnetic wave, third electromagnetic wave, and the like may be reflected by the detection object 10, and the at least two signal transceivers may receive the corresponding reflected waves. The at least two signal transceivers may output the electrical signal corresponding to the received reflected wave, and the processor 120 may determine the position of the detection object 10 based on the output electrical signal (1006). In more detail, the processor 120 may calculate the distance between at least two of the signal transceivers and the detection object 10 based on a time difference between when the electromagnetic wave is radiated and when the reflection wave is received, and may determine the coordinates of the detection object 10 based on the calculated distance. When all of the signal transceivers are installed in the detection object positioning apparatus 100 horizontally or approximately horizontally with one surface of the detection object positioning apparatus 100, the processor 120 may calculate the coordinates on a 2D plane of the detection object 10. In addition, when at least one of the signal transceivers is set to be inclined with respect to one surface of the detection object positioning apparatus 100, the processor 120 may determine the coordinates in a 3D space of the detection object 10.

When the position of the detection object 10 is determined, the detection object positioning apparatus 100 may perform the predetermined operation according to the determined position (1007).

Figure 27:
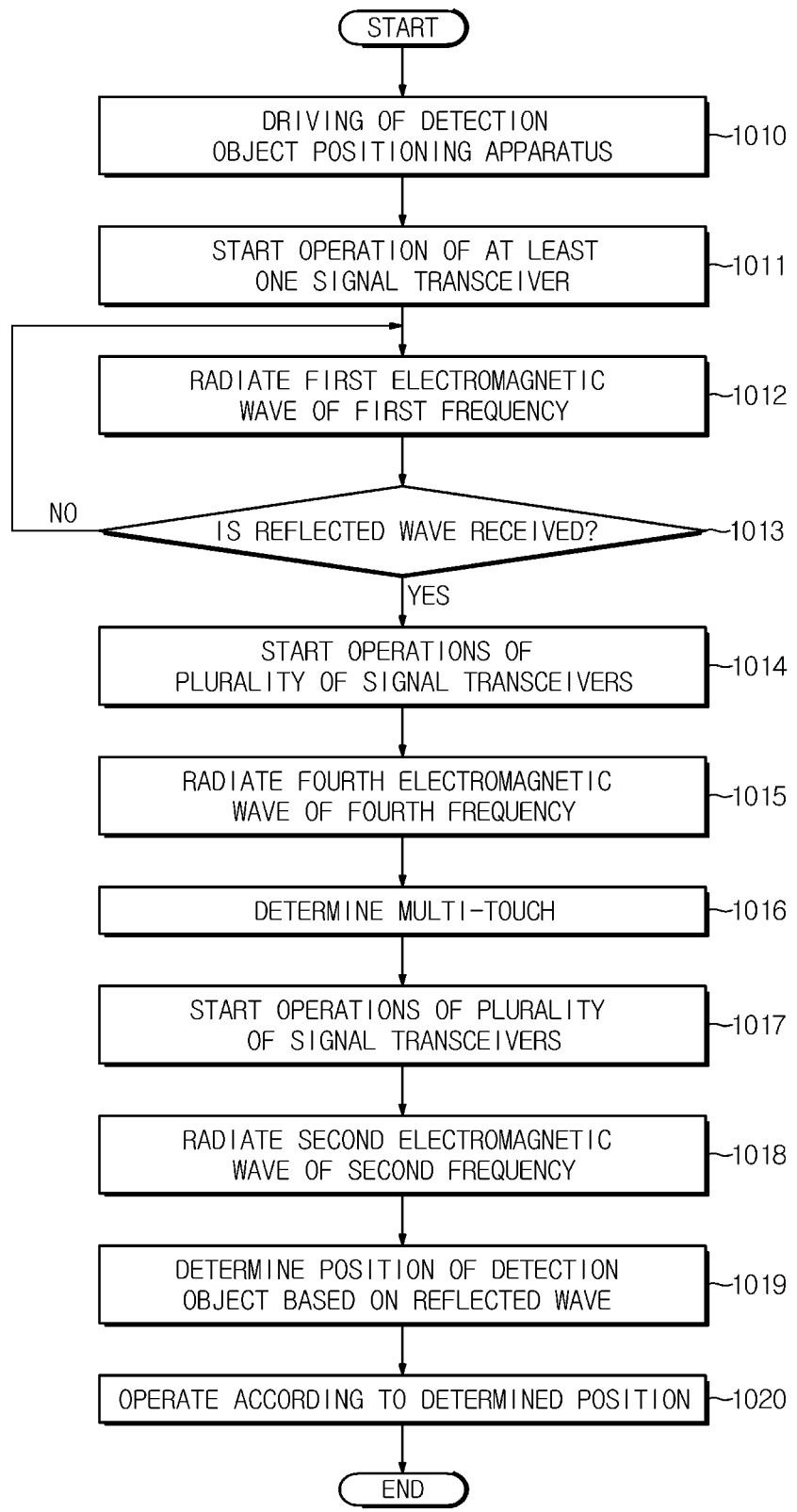
FIG. 27 is a flowchart of a second embodiment of a detection object positioning method.

FIG. 27 is a flowchart of a second embodiment of a detection object positioning method.

Referring to FIG. 27, the detection object positioning apparatus 100 may start the driving according to the predefined setting or the user's operation (1010).

The at least one signal transceiver of the plurality of signal transceivers provided in the detection object positioning apparatus 100 may start the operation (1011), whereby the first electromagnetic wave of the first frequency may be radiated from the at least one signal transceiver (1012). Here, the plurality of signal transceivers may be installed around one surface of the detection object positioning apparatus 100 as described above. The first frequency may include the frequency of relatively low magnitude.

When the detection object 10 is in contact with or close to one surface of the detection object positioning apparatus 100, the first electromagnetic wave may be reflected by the detection object 10, and the at least one signal transceiver in operation may receive the first reflected wave corresponding to the first electromagnetic wave (YES in 1013).

When the at least one signal transceiver receives the first electromagnetic wave, in response, the processor 120 may determine that the touch operation has been started, and the at least two signal transceivers of the plurality of signal transceivers may be controlled to radiate the fourth electromagnetic wave of the fourth frequency or the fifth electromagnetic wave of the fifth frequency, and the like (1014, 1015). Here, the fourth frequency and the fifth frequency may be relatively larger than the first frequency. Therefore, the fourth electromagnetic wave and the fifth electromagnetic wave have relatively lower diffraction and higher resolution than the first electromagnetic wave.

The fourth electromagnetic wave of the fourth frequency or the fifth electromagnetic wave of the fifth frequency may be reflected by the detection object 10, and the corresponding fourth reflected wave and fifth reflected wave may be transmitted to the at least two signal transceivers. The processor 120 may determine whether the plurality of detection objects exist based on the fourth reflected wave and the fifth reflected wave (1016). Since the fourth frequency and the fifth frequency are relatively smaller than the second frequency, the third frequency, the sixth frequency, the seventh frequency, and the eighth frequency, which will be described later, the fourth electromagnetic wave and the fifth electromagnetic wave may have a relatively higher diffraction than the second electromagnetic wave of the second frequency, the third electromagnetic wave of the third frequency, the sixth electromagnetic wave of the sixth frequency, the seventh electromagnetic wave of the seventh frequency, and/or the eighth electromagnetic wave of the eighth frequency. Therefore, when there are the plurality of detection objects on the path of the electromagnetic wave, the fourth electromagnetic wave and the fifth electromagnetic wave may be reflected by the respective detection object. Therefore, the processor 120 may obtain information about the plurality of detection objects. Accordingly, the processor 120 may determine the existence of the plurality of detection objects, that is, whether to perform the multi-touch.

After determining whether to perform the multi-touch, the processor 120 may control the at least two signal transceivers, and each of the signal transceivers may start the operation to radiate the electromagnetic waves of the predetermined frequencies (1017, 1018). For example, each of the signal transceiver may radiate the second electromagnetic wave of the second frequency, the third electromagnetic wave of the third frequency, the sixth electromagnetic wave of the sixth frequency, the seventh electromagnetic wave of the seventh frequency, and/or the eighth electromagnetic wave of the eighth frequency. As described above, the at least one of the at least two signal transceivers may be formed to be inclined with respect to one plane of the detection object positioning apparatus 100. In addition, the second frequency, the third frequency, the sixth frequency, the seventh frequency, and the eighth frequency may be the frequencies having the relatively higher value than the first frequency, the fourth frequency, and the fifth frequency.

The at least two signal transceivers may receive the reflected waves corresponding to the radiated electromagnetic waves, and the processor 120 may receive the electrical signals corresponding to the received reflected waves. The processor 120 may determine the position of the detection object 10 in the same manner as described above using the electrical signals corresponding to the received reflected waves (1019).

When the position of the detection object 10 is determined, the detection object positioning apparatus 100 may perform the predetermined operation according to the determined position (1020).

The detection object positioning method according to the above-described embodiment may be implemented in the form of a program that can be executed by a computer device. The program may include program instructions, data files, and data structures alone or in combination. The program may be designed or manufactured by using a machine language code or a high level language code. In addition, the program may be particularly designed to implement the above-described methods or may be implemented by using various functions or definitions that are well-known and available to a group having ordinary skill in the computer software field.

A program for implementing the detection object positioning method may be recorded on a computer-readable recording medium. The computer-readable recording medium may include various types of hardware devices capable of storing specific programs that are executed in response to a call from a computer, e.g., magnetic disk storage media such as a hard disk or a floppy disk, optical recording media such as a magnetic tape, a compact disc (CD) or a DVD, magneto-optical recording media such as a floptical disk, and semiconductor memory devices such as ROM, RAM, or flash memory.

Hereinbefore, various embodiments of the detection object positioning apparatus and the detection object positioning method have been described. However, the apparatus and the method are not limited to the above-described embodiments. Various apparatuses or methods that can be implemented by one having ordinary skill in the related art through correction and modification based on the above-described embodiments may also be examples of the detection object positioning apparatus and the detection object positioning method. For example, although the above-described techniques are performed in an order different from that of the above-described method, and/or the above-described components, such as the system, structure, apparatus, and circuit, are coupled or combined in a different form from that of the above-described method, or replaced or substituted with other components or equivalents, proper results can be achieved.

What is claimed is:

1. A display apparatus comprising:
   a first signal transceiver;
   a second signal transceiver installed at a position different from the first signal transceiver;
   a display; and
   a processor configured to:
   control at least one of the first signal transceiver or the second signal transceiver to radiate a first electromagnetic wave of a first frequency;
   based on at least one of the first signal transceiver or the second signal transceiver receiving a first reflected wave reflected from at least one detection object, control the first signal transceiver to radiate a second electromagnetic wave of a second frequency higher than the first frequency; and control the second signal transceiver to radiate a third electromagnetic wave of a third frequency higher than the first frequency;
   determine a position of the at least one detection object based on a second reflected wave corresponding to the second electromagnetic wave and a third reflected wave corresponding to the third electromagnetic wave;
   generate a control signal corresponding to the position of the at least one detection object; and
   control the display to operate based on the control signal,
   wherein the processor is further configured to control the first signal transceiver to transmit a fourth electromagnetic wave of a fourth frequency that is higher than the first frequency and lower than the second frequency and to control the second signal transceiver to transmit a fifth electromagnetic wave of a fifth frequency that is higher than the first frequency and lower than the third frequency,
   wherein the first signal transceiver is configured to receive a fourth reflected wave corresponding to the fourth electromagnetic wave, and
   wherein the second signal transceiver is configured to receive a fifth reflected wave corresponding to the fifth electromagnetic wave.

2. The display apparatus according to claim 1, wherein the processor is configured to determine whether a plurality of the detection objects exist based on the fourth reflected wave or the fifth reflected wave.

3. The display apparatus according to claim 2, wherein, based on determining that the plurality of detection objects exist, the processor is configured to control the first signal transceiver and the second signal transceiver to transmit the second electromagnetic wave and the third electromagnetic wave, respectively.

4. The display apparatus according to claim 3, further comprising:
   a third signal transceiver disposed at a position different from the first signal transceiver and the second signal transceiver, configured to radiate a sixth electromagnetic wave,
   wherein, based on determining that the plurality of detection objects exist, the processor is configured to control the first signal transceiver, the second signal transceiver, and the third signal transceiver to transmit the second electromagnetic wave, the third electromagnetic wave, and the sixth electromagnetic wave, respectively.

5. The display apparatus according to claim 4, wherein the processor is configured to determine a position of any one of the plurality of detection objects based on at least one of the first signal transceiver, the second signal transceiver, or the third signal transceiver.

6. The display apparatus according to claim 1, wherein the processor is configured to control the first signal transceiver to radiate the first electromagnetic wave periodically or continuously.

7. The display apparatus according to claim 1, further comprising:
a third signal transceiver configured to radiate a sixth electromagnetic wave in an inclined direction with respect to one surface on which a screen of the display is displayed, and to receive a sixth reflected wave corresponding to the sixth electromagnetic wave and reflected by the at least one detection object.

8. The display apparatus according to claim 7, wherein the processor is configured to determine a position of the at least one detection object based on the second reflected wave, the third reflected wave, and the sixth reflected wave.

9. The display apparatus according to claim 8, wherein the processor is configured to determine distances between the at least one detection object and the first signal transceiver, the second signal transceiver, and the third signal transceiver based on the second reflected wave, the third reflected wave, and the sixth reflected wave, and to determine the distance between the at least one detection object and the one surface using the determined distances.

10. A method of controlling a display apparatus comprising:
transmitting, by a first signal transceiver, a first electromagnetic wave of a first frequency;
receiving, by the first signal transceiver, a first reflected wave corresponding to the first electromagnetic wave and reflected by a detection object;
transmitting, by the first signal transceiver, a second electromagnetic wave of a second frequency higher than the first frequency, and receiving a second reflected wave corresponding to the second electromagnetic wave;
transmitting, by a second signal transceiver, a third electromagnetic wave of a third frequency higher than the first frequency, and receiving a third reflected wave corresponding to the third electromagnetic wave; and
determining, by a processor, a position of the detection object based on the second reflected wave and the third reflected wave,
the method further comprising:
transmitting, by the first signal transceiver, a fourth electromagnetic wave of a fourth frequency that is higher than the first frequency and lower than the second frequency;
transmitting, by the second signal transceiver, a fifth electromagnetic wave of a fifth frequency that is higher than the first frequency and lower than the third frequency;
receiving a fourth reflected wave corresponding to the fourth electromagnetic wave; and
receiving a fifth reflected wave corresponding to the fifth electromagnetic wave.

11. The method according to claim 10, further comprising:
determining, by the processor, whether a plurality of the detection objects exist based on the fourth reflected wave or the fifth reflected wave.

12. The method according to claim 11, further comprising:
based on determining that the plurality of detection objects exist, transmitting, by the first signal transceiver, the second signal transceiver, and a third signal transceiver, the second electromagnetic wave, the third electromagnetic wave, and a sixth electromagnetic wave, respectively, wherein the third signal transceiver is installed at a position different from the first signal transceiver and the second signal transceiver; and
determining, by the processor, a position of any one of the plurality of detection objects based on at least one of the first signal transceiver, the second signal transceiver, and the third signal transceiver.

13. The method according to claim 10, wherein further comprising:
radiating, by a third signal transceiver, a sixth electromagnetic wave, and receiving a sixth reflected wave correspond to the sixth electromagnetic wave and reflected from at least one detection object; and
determining, by the processor, a position of the at least one detection object based on the second reflected wave, the third reflected wave, and the sixth reflected wave,
wherein the third signal transceiver is configured to radiate electromagnetic waves in an inclined direction with respect to one surface on which a screen of a display is displayed.

* * * * *